United States Patent
Zaworotko et al.

(10) Patent No.: US 9,504,986 B2
(45) Date of Patent: Nov. 29, 2016

(54) METAL-ORGANIC MATERIALS (MOMS) FOR POLARIZABLE GAS ADSORPTION AND METHODS OF USING MOMS

(71) Applicant: UNIVERSITY OF SOUTH FLORIDA, Tampa, FL (US)

(72) Inventors: Michael Zaworotko, Tampa, FL (US); Patrick Nugent, Tampa, FL (US); Vanessah Rhodus, Sun City Center, FL (US)

(73) Assignee: University of South Florida, Tampa, FL (US)

( * ) Notice: Subject to any disclaimer, the term of this patent is extended or adjusted under 35 U.S.C. 154(b) by 0 days.

(21) Appl. No.: 14/431,851

(22) PCT Filed: Nov. 7, 2013

(86) PCT No.: PCT/US2013/068879
§ 371 (c)(1),
(2) Date: Mar. 27, 2015

(87) PCT Pub. No.: WO2014/074679
PCT Pub. Date: May 15, 2014

(65) Prior Publication Data
US 2015/0246340 A1 Sep. 3, 2015

Related U.S. Application Data

(63) Continuation of application No. 13/800,690, filed on Mar. 13, 2013, now Pat. No. 9,138,719.

(60) Provisional application No. 61/723,533, filed on Nov. 7, 2012, provisional application No. 61/723,914, filed on Nov. 8, 2012.

(51) Int. Cl.
*B01D 53/02* (2006.01)
*B01J 20/22* (2006.01)

(52) U.S. Cl.
CPC ............ *B01J 20/226* (2013.01); *B01D 53/02* (2013.01); *B01D 2253/1122* (2013.01); *B01D 2253/204* (2013.01); *B01D 2256/10* (2013.01);
(Continued)

(58) Field of Classification Search
CPC ............... B01D 2253/1122; B01D 2253/204; B01D 2256/10; B01D 2256/245; B01D 2257/504; B01D 53/02; B01J 20/226; Y02C 10/08
See application file for complete search history.

(56) References Cited

U.S. PATENT DOCUMENTS

| | | | | |
|---|---|---|---|---|
| 6,066,359 A | * | 5/2000 | Yao | B01J 27/12 423/610 |
| 9,138,719 B1 | * | 9/2015 | Eddaoudi | B01J 20/226 |
| 2004/0265507 A1 | * | 12/2004 | Xiong | C09C 1/0015 427/561 |

OTHER PUBLICATIONS

Aprea, et al. (2010). "Modeling Carbon Dioxide Adsorption on Microporous Substrates: Comparison between Cu-BTC Metal-Organic Framework and 13X Zeolitic Molecular Sieve." J. Chem. Eng. Data, 55, 3655-3661.
(Continued)

*Primary Examiner* — Christopher P Jones
(74) *Attorney, Agent, or Firm* — Thomas Horstemeyer, LLP

(57) ABSTRACT

Embodiments of the present disclosure provide for multi-component metal-organic materials (MOMs) systems that exhibit permanent porosity and using MOMs to separate components in a gas mixture, methods of separating polarizable gases from a gas mixture, and the like.

11 Claims, 9 Drawing Sheets

(52) U.S. Cl.
CPC ... *B01D2256/245* (2013.01); *B01D 2257/504* (2013.01); *Y02C 10/08* (2013.01)

(56) References Cited

OTHER PUBLICATIONS

Babarao, et al. (2007). "Storage and Separation of CO2 and CH4 in Silicalite, C168 Schwarzite, and IRMOF-1: A Comparative Study from Monte Carlo Simulation." Langmuir, 23, 659-666.
Bae, et al. (2008). "Separation of CO2 from CH4 Using Mixed-Ligand Metal-Organic Frameworks." Langmuir, 24, 8592-8598.
Potenza, et al. (1999). "Effects of regulators of G protein-signaling proteins on the functional response of the mu-opioid receptor in a melanophore-based assay." The Journal of Pharmacology and Experimental Therapeutics, 291:482-491.
Banerjee, et al. (2009). Control of Pore Size and Functionality in Isoreticular Zeolitic Imidazolate Frameworks and their Carbon Dioxide Selective Capture Properties. Journal of the American Chemical Society, 3875-3877.
Bao, et al. (2011). Adsorption of CO2 and CH4 on a magnesium-based metal organic framework. Journal of Colloid and Interface Science, 353, 549-556.
Bastin, et al. (2008). A Microporous Metal-Organic Framework for Separation of CO2/N2 and CO2/CH4 by Fixed-Bed Adsorption. Journal of Physical Chemistry C, 112, 1575-1581.
Belof, et al. (2007). On the Mechanism of Hydrogen Storage in a Metal-Organic Framework Material. Journal of the American Chemical Society, 129, 15202-15210.
Belof, et al. (2009). A Predictive Model of Hydrogen Sorption for Metal-Organic Materials. The Journal of Physical Chemistry C, 113, 9316-9320.
Belof, al. et al (2008). An Accurate and Transferable Intermolecular Diatomic Hydrogen Potential for Condensed Phase Simulation. Journal of Chemical Theory and Computation, 4, 1332-1337.
Biradha, et al. (2006). Crystal engineering of coordination polymers using 4,4'-bipyridine as a bond between transition metal atoms. ChemComm, 4169-4179-4169-4179.
Burd, et al. (2012). Highly Selective Carbon Dioxide Uptake by [Cu(bpy-)(SiF)] (bpy-1 = 4,4'-Bipyridine; bpy-2 = 1,2-Bis (4-pyridypethene). Journal of the American Chemical Society, 134, 3663-3666.
Carlucci, et al. (1998). Three-dimensional architectures of intertwined planar coordination polymers: The first case of interpenetration involving two different bidimensional polymeric motifs. New Journal of Chemistry, 1319-1321.
Caskey, et al. (2008). Dramatic Tuning of Carbon Dioxide Uptake via Metal Substitution in a Coordination Polymer with Cylindrical Pores. Journal of the American Chemical Society, 130, 10870-10871.
Chen, et al. (2010). A Microporous Metal-Organic Framework with Immobilized—OH Functional Groups within the Pore Surfaces for Selective Gas Sorption. European Journal of Inorganic Chemistry, 3745-3749.
Cheon, et al. (2009). Selective gas adsorption in a magnesium-based metal—organic framework. Chemical Communications, 5436-5438-5436-5438.
Chowdhury, et al. (2012). Adsorption of Co, CO2 and CH4 on Cu-BTC and MIL-101 metal organic frameworks: Effect of open metal sites and adsorbate polarity. Microporous and Mesoporous Materials, 152, 246-252.
Chowdhury, et al. (2009). Gas Adsorption Properties of the Chromium-Based Metal Organic Framework MIL-101. The Journal of Physical Chemistry C, 113, 6616-6621.
Chui, S. (1999). A Chemically Functionalizable Nanoporous Material [Cu3(TMA)2(H2O)3]n. Science, 283, 1148-1150.
Cmarik, et al. (2012). Tuning the Adsorption Properties of UiO-66 via Ligand Functionalization. Langmuir, 28, 15606-15613.
Colodrero, et al. (2012). High Proton Conductivity in a Flexible, Cross-Linked, Ultramicroporous Magnesium Tetraphosphonate Hybrid Framework. Inorganic Chemistry, 51, 7689-7698.
Dolomanov, et al. (2009). OLEX2: A complete structure solution, refinement and analysis program. Journal of Applied Crystallography, 42, 339-341-339-341.
Dybtsev, et al. (2006). A Homochiral Metal-Organic Material with Permanent Porosity, Enantioselective Sorption Properties, and Catalytic Activity. Angewandte Chemie, 45, 930-934.
Farrugia, et al. (1999). WingX suite for small-molecule single-crystal crystallography. Journal of Applied Crystallography, 32, 837-838.
Ferey, et al. (2005). A Chromium Terephthalate-Based Solid with Unusually Large Pore Volumes and Surface Area. Science, 309, 2040-2042.
Ferrando-Soria, et al. (2012). Selective Gas and Vapor Sorption and Magnetic Sensing by an Isoreticular Mixed-Metal—Organic Framework. Journal of the American Chemical Society, 134, 15301-15304.
Forgan, et al. (2012). Nanoporous Carbohydrate Metal-Organic Frameworks. Journal of the American Chemical Society, 134, 406-417.
Forrest, et al (2012). Simulation of the Mechanism of Gas Sorption in a Metal-Organic Framework with Open Metal Sites: Molecular Hydrogen in PCN-61. The Journal of Physical Chemistry C, 15538-15549.
Gable, et al. (1990). A new type of interpenetration involving enmeshed independent square grid sheets. The structure of diaquabis-(4,4?-bipyridine)zinc hexafluorosilicate. Journal of the Chemical Society, Chemical Communications, 1677-8.
Goetz, et al. (2006). Carbon dioxide-methane mixture adsorption on activated carbon. Adsorption, 12, 55-63.
Guo, et al. (2011). A Metal-Organic Framework with Optimized Open Metal Sites and Pore Spaces for High Methane Storage at Room Temperature. Angewandte Chemie, 50, 3236-3239.
Hou, et al. (2012). Novel (3,4,6)-Connected Metal—Organic Framework with High Stability and Gas-Uptake Capability. Inorganic Chemistry, 8402-8408.
Lin, et al. (2012). Microwave-Assisted Synthesis of a Series of Lanthanide Metal—Organic Frameworks and Gas Sorption Properties. Inorganic Chemistry, 51, 1813-1820.
Kidnay, et al. (1966). A simplified method for the prediction of multicomponent adsorption equilibria from single gas isotherms. AIChE Journal, 12(5), 981-986.
Kim, T., & Suh, M. (2011). Selective CO2 adsorption in a flexible non-interpenetrated metal—organic framework. Chemical Communications, 47, 4258-4260.
Kizzie, et al. (2011). Effect of Humidity on the Performance of Microporous Coordination Polymers as Adsorbents for COCapture. Langmuir, 27, 6368-6373.
Li, et al. (2012). Enhanced Binding Affinity, Remarkable Selectivity, and High Capacity of CO2 by Dual Functionalization of a rht-Type Metal-Organic Framework. Angewandte Chemie, 51, 1441-1444.
Lin, et al. (2011). Molecular tectonics: Control of interpenetration in cuboid 3-D coordination networks. CrystEngComm, 13, 776-8.
Lu, et al. (2012). A Highly Porous and Robust (3,3,4)-Connected Metal-Organic Framework Assembled with a 90° Bridging-Angle Embedded Octacarboxylate Ligand. Angewandte Chemie, 51, 1580-1584.
Lu, et al. (2012). Water Stable Metal—Organic Framework Evolutionally Formed from a Flexible Multidentate Ligand with Acylamide Groups for Selective CO2 Adsorption. Crystal Growth & Design, 12, 1081-1084.
Märcz, et al. (2012). The iron member of the CPO-27 coordination polymer series: Synthesis, characterization, and intriguing redox properties. Microporous and Mesoporous Materials, 157, 62-74.
Mcdonald, et al. (2012). Capture of Carbon Dioxide from Air and Flue Gas in the Alkylamine-Appended Metal—Organic Framework mmen-Mg(dobpdc). Journal of the American Chemical Society, 7056-7065.

(56) References Cited

OTHER PUBLICATIONS

Mclaughlin, et al. (2012). A molecular H2 potential for heterogeneous simulations including polarization and many-body van der Waals interactions. The Journal of Chemical Physics.
Ferey. (2005). A Chromium Terephthalate-Based Solid with Unusually Large Pore Volumes And Surface Area. Science, 2040-2042.
Millward, A., & Yaghi, O. (2005). Metal-Organic Frameworks with Exceptionally High Capacity for Storage of Carbon Dioxide at Room Temperature. Journal of the American Chemical Society, 127, 17998-17999.
Mishra, P., Mekala, S., Dreisbach, F., Mandal, B., & Gumma, S. (2012). Adsorption of CO2, CO, CH4 and N2 on a zinc based metal organic framework. Separation and Purification Technology, 94, 124-130.
Myers, A., & Prausnitz, J. (1965). Thermodynamics of mixed-gas adsorption. AIChE Journal, 11(1), 121-127.
Noro, et al. (2000). A New, Methane Adsorbent, Porous Coordination Polymer [{CuSiF6(4,4'-bipyridine)2)n]. Angewandte Chemie International Edition, 39(12), 2081-2084-2081-2084.
Nouar, et al. (2008). Supermolecular Building Blocks (SBBs) for the Design and Synthesis of Highly Porous Metal-Organic Frameworks. Journal of the American Chemical Society, 130, 1833-1835.
Park, et al. (2011). A Highly Porous Metal-Organic Framework: Structural Transformations of a Guest-Free MOF Depending on Activation Method and Temperature. Chemistry—A European Journal, 17, 7251-7260.
Prasad, et al. (2010). High Gas Sorption and Metal-Ion Exchange of Microporous Metal-Organic Frameworks with Incorporated Imide Groups. Chemistry—A European Journal, 16, 14043-14050.
Rosi, et al. (2005). Rod Packings and Metal-Organic Frameworks Constructed from Rod-Shaped Secondary Building Units. Journal of the American Chemical Society, 127, 1504-1518.
Sheldrick, G. (1990). Phase annealing in SHELX-90: Direct methods for larger structures. Acta Crystallographica Section a Foundations of Crystallography, 467-473.
Sheldrick. (2008). A Short History of SHELX. Acta Cryst., A64, 112-122.
Simmons, J., Wu, H., Zhou, W., & Yildirim, T. (2011). Carbon capture in metal-organic frameworks—a comparative study. Energy & Environmental Science, 4, 2177-2185.
Si, et al. (2011). High and selective CO2 uptake, H2 storage and methanol sensing on the amine-decorated 12-connected MOF CAU-1. Energy & Environmental Science, 4, 4522-7.
Spek, A. (1990). Bypass: An effective method for the refinement of crystal structures containing disordered solvent regions. Acta Crystallographica Section a Foundations of Crystallography, A46, 194-201.
Stern, et al. (2012). Understanding hydrogen sorption in a polar metal-organic framework with constricted channels. The Journal of Chemical Physics, 136.
Subramanian, S., & Zaworotko, M. (1995). Porous Solids by Design:[Zn(4,4'-bpy)2(SiF6)]n•xDMF, a Single Framework Octahedral Coordination Polymer with Large Square Channels. Angewandte Chemie International Edition in English, 2127-2129.

Tan, et al. (2012). Microporous Metal-Organic Framework Based on Mixing Nanosized Tris((4-carboxyl)-phenylduryl) amine and 4,4'-Bipyridine Ligands for Gas Storage and Separation. Crystal Growth & Design, 12, 2468-2471.
Tan, et al. (2011). High capacity gas storage by a 4,8-connected metal-organic polyhedral framework. Chemical Communications, 47, 4487-9.
Volkringer, et al. (2009). Occurrence of Uncommon Infinite Chains Consisting of Edge-Sharing Octahedra in a Porous Metal Organic Framework-Type Aluminum Pyromellitate Al(OH)[COH] (MIL-120): Synthesis, Structure, and Gas Sorption Properties. Chemistry of Materials, 21(24), 5783-5791.
Sumida, et al. (2012). Carbon Dioxide Capture in Metal-Organic Frameworks. Chemical Reviews, 112, 724-781.
Wang, et al. (2008). Colossal cages in zeolitic imidazolate frameworks as selective carbon dioxide reservoirs. Nature, 453, 207-211.
Xiang, et al. (2005). A 3D Canted Antiferromagnetic Porous Metal-Organic Framework with Anatase Topology through Assembly of an Analogue of Polyoxometalate. Journal of the American Chemical Society, 127, 16352-16353.
Xiang, et al. (2011). CNT@Cu3(BTC)2 and MetalOrganic Frameworks for Separation of CO2/CH4 Mixture. (2011). The Journal of Physical Chemistry, 115, 19864-19871.
Yang, et al. (2012). A partially interpenetrated metal-organic framework for selective hysteretic sorption of carbon dioxide. Nature Materials, 11, 710-716.
Yazayd in, et al. (2009). Screening of Metal-Organic Frameworks for Carbon Dioxide Capture from Flue Gas Using a Combined Experimental and Modeling Approach. Journal of the American Chemical Society, 131, 18198-18199.
Yoon, et al. (2007). Gas-Sorption Selectivity of CUK-1: A Porous Coordination Solid Made of Cobalt(II) and Pyridine-2,4-Dicarboxylic Acid. Advanced Materials, 1830-1834.
Zhang, et al. (2010). A Robust Highly Interpenetrated Metal-Organic Framework Constructed from Pentanuclear Clusters for Selective Sorption of Gas Molecules. Inorganic Chemistry, 49, 8444-8448.
Zhang, et al. (2012). Computational Study of Adsorption and Separation of CO2, CH4, and N2 by an rht-Type Metal-Organic Framework. Langmuir, 28, 12122-12133.
Zhang, et al. (2010). A rod packing microporous metal-organic framework with open metal sites for selective guest sorption and sensing of nitrobenzene. Chemical Communications, 46, 7205-7.
Zheng. (2011). Enhanced CO2 Binding Affinity of a High-Uptake rht-Type Metal-Organic Framework Decorated with Acylamide Groups. J. Am. Chem. Soc., 133(4), 748-751.
Zhuang, et al. (2012). Robust Metal-Organic Framework with an Octatopic Ligand for Gas Adsorption and Separation: Combined Characterization by Experiments and Molecular Simulation. Chemistry of Materials, 24, 18-25.
Xiang, S., He, Y., Zhang, Z., Wu, H., Zhou, W., Krishna, R., & Chen, B. (2012). Microporous metal-organic framework with potential for carbon dioxide capture at ambient conditions. Nature Communications.

* cited by examiner

R = N-donor pendant group

Ligands belonging to Subset I may contain a) non-aromatic or b) aromatic BGs. The R groups denote N-donor PGs N-donor PGs of ligands in Subset I. An asterisk denotes the point of attachment to the BG.

An illustration of the combination of a BG and two PGs in Subset I.

Examples of ligands belonging to Subset II.

US 9,504,986 B2

1

METAL-ORGANIC MATERIALS (MOMS) FOR POLARIZABLE GAS ADSORPTION AND METHODS OF USING MOMS

CROSS-REFERENCE TO RELATED APPLICATION

This application is the 35 U.S.C. §371 national stage of, and claims priority to and the benefit of, PCT application PCT/US2013/068879, filed Nov. 7, 2013, which claims priority to and the benefit of U.S. Provisional Application entitled "ENHANCEMENT OF $CO_2$ SELECTIVITY IN A PILLARED PCU MOM PLATFORM THROUGH PILLAR SUBSTITUTION," having Ser. No. 61/723,914, filed on Nov. 8, 2012, which is entirely incorporated herein by reference.

This application claims priority to U.S. provisional application entitled "METAL ORGANIC COMPOSITION, FOR CARBON DIOXIDE SEPARATION AND CAPTURE," having Ser. No. 61/723,533, filed on Nov. 7, 2012, which is entirely incorporated herein by reference.

This application is a CIP of U.S. Utility application entitled "METAL-ORGANIC MATERIALS (MOMS) FOR $CO_2$ ADSORPTION AND METHODS OF USING MOMS", having Ser. No. 13/800,690, filed on Mar. 13, 2013, which is incorporated herein by reference; which claims priority to U.S. provisional application entitled "METAL ORGANIC COMPOSITION, FOR CARBON DIOXIDE SEPARATION AND CAPTURE," having Ser. No. 61/682,017, filed on Aug. 10, 2012, which is entirely incorporated herein by reference; and also claims priority to U.S. provisional application entitled "METAL ORGANIC COMPOSITION, FOR CARBON DIOXIDE SEPARATION AND CAPTURE," having Ser. No. 61/723,533, filed on Nov. 7, 2012, which is entirely incorporated herein by reference.

BACKGROUND

Metal-organic framework (MOF) materials that exhibit permanent porosity have received extensive interest due to their potential applications for gas storage or capture. However, many of the currently used MOFs have limitations, in particular, use in humid conditions, and thus, other types of MOFs having desired characteristics are needed to be used in certain applications.

SUMMARY

Embodiments of the present disclosure provide for multicomponent metal-organic materials (MOMs) systems that exhibit permanent porosity and using MOMs to separate components in a gas, methods of separating polarizable gases from a gas, and the like.

An embodiment of the method of capturing a polarizable gas in a gas mixture, among others, includes: exposing the gas mixture to a multicomponent metal-organic material (MOM) of general formula $[ML_2 \text{ TIFSIX}]_n$, n is 1 to $10^{18}$, wherein the gas mixture includes the polarizable gas, wherein the MOM has a greater relative affinity for the polarizable gas than the other components in the gas mixture; wherein M is a divalent or trivalent metal, wherein L is a bifunctional linker molecule based upon two nitrogen donor moieties; and TIFSIX is hexafluorotitanate or hexafluorostannate; and capturing the polarizable gas in the MOM.

An embodiment of the system for separating components in a gas mixture, among others, includes: a first structure including a multidimensional metal-organic material (MOM), of general formula $[ML_2 \text{ TIFSIX}]_n$, n is 1 to $10^{18}$, wherein the gas mixture includes the polarizable gas, wherein the MOM has a greater relative affinity for the polarizable gas than the other components in the gas mixture; wherein M is a divalent or trivalent metal, wherein L is a bifunctional linker molecule based upon two nitrogen donor moieties; and TIFSIX is hexafluorotitanate or hexafluorostannate, wherein the gas includes a first component and a second component, wherein the MOM has a greater relative affinity for the first component over the second component; and a second structure for introducing the gas to the first structure, wherein first component is substantially (e.g., about 60% or more, about 70% or more, about 80% or more, about 90% or more, about 95% or more, about 99% or more, or about 99.9% or more, is removed from the gas mixture) removed from the gas mixture after the exposure to the MOM to form a modified gas mixture, wherein the second structure flows the modified gas mixture away from the first structure.

BRIEF DESCRIPTION OF THE DRAWINGS

Many aspects of the disclosed devices and methods can be better understood with reference to the following drawings. The components in the drawings are not necessarily to scale, emphasis instead being placed upon clearly illustrating the relevant principles. Moreover, in the drawings, like reference numerals designate corresponding parts throughout the several views.

DISCUSSION

Figure 1:
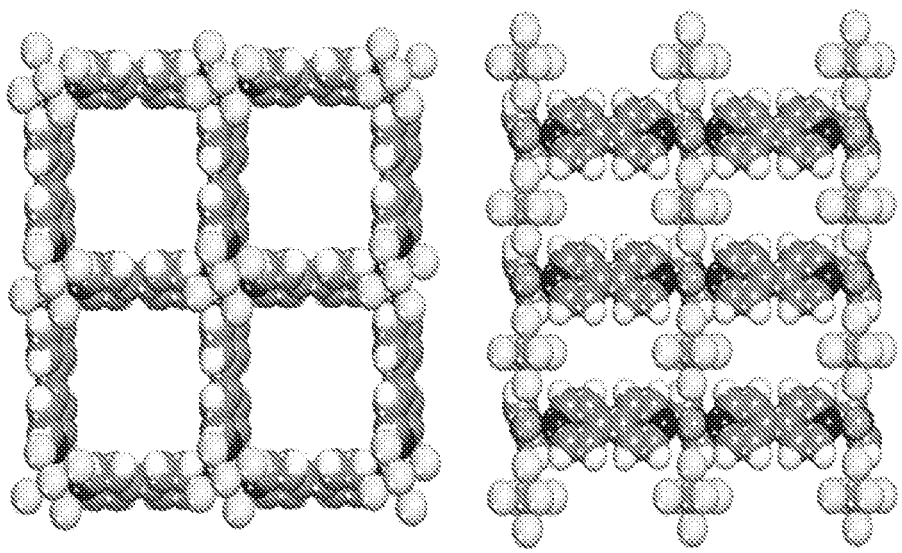
FIG. 1 illustrates the structure of TIFSIX-1-Cu viewed along the c axis (left) and a axis (right).

Before the present disclosure is described in greater detail, it is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, organic chemistry, organometallic chemistry, coordination chemistry and the like, which are within the skill of the art. Such techniques are explained fully in the literature.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 25° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

DEFINITIONS

The term "substituted" refers to any one or more hydrogens on the designated atom that can be replaced with a selection from the indicated group, provided that the designated atom's normal valence is not exceeded (though charged and radical variants are acceptable (e.g., $RNH_3^+$ versus $RNH_2$), and that the substitution results in a suitably stable compound.

The term "aliphatic group" refers to a saturated or unsaturated linear or branched hydrocarbon group and encompasses alkyl, alkenyl, and alkynyl groups, for example.

As used herein, "alkyl" or "alkyl group" refers to a saturated aliphatic hydrocarbon radical which can be straight or branched, having 1 to 20 carbon atoms, wherein the stated range of carbon atoms includes each intervening integer individually, as well as sub-ranges. Examples of alkyl include, but are not limited to methyl, ethyl, n-propyl, i-propyl, n-butyl, s-butyl, t-butyl, n-pentyl, and s-pentyl. The term "lower alkyl" means an alkyl group having less than 10 carbon atoms.

As used herein, "alkenyl" or "alkenyl group" refers to an aliphatic hydrocarbon radical which can be straight or branched, containing at least one carbon-carbon double bond, having 2 to 20 carbon atoms, where the stated range of carbon atoms includes each intervening integer individually, as well as sub-ranges. Examples of alkenyl groups include, but are not limited to, ethenyl, propenyl, n-butenyl, i-butenyl, 3-methylbut-2-enyl, n-pentenyl, heptenyl, octenyl, decenyl, and the like.

The term "substituted," as in "substituted alkyl", "substituted cycloalkyl," "substituted cycloalkenyl," substituted aryl," substituted biaryl," "substituted fused aryl" and the like means that the substituted group may contain in place of one or more hydrogens a group such as hydroxy, amino, halo, trifluoromethyl, cyano, —NH(lower alkyl), —N(lower alkyl)$_2$, lower alkoxy, lower alkylthio, or carboxy, and thus embraces the terms haloalkyl, alkoxy, fluorobenzyl, and the sulfur and phosphorous containing substitutions referred to below.

As used herein, "halo", "halogen", or "halogen radical" refers to a fluorine, chlorine, bromine, and iodine, and radicals thereof. Further, when used in compound words, such as "haloalkyl" or "haloalkenyl", "halo" refers to an alkyl or alkenyl radical in which one or more hydrogens are substituted by halogen radicals. Examples of haloalkyl include, but are not limited to, trifluoromethyl, trichloromethyl, pentafluoroethyl, and pentachloroethyl.

The term "cycloalkyl" refers to a non-aromatic mono- or multicyclic ring system of about 3 to about 10 carbon atoms, preferably of about 5 to about 10 carbon atoms. Preferred ring sizes of rings of the ring system include about 5 to about 6 ring atoms. Exemplary monocyclic cycloalkyl include cyclopentyl, cyclohexyl, cycloheptyl, and the like. Exemplary multicyclic cycloalkyl include 1-decalin, norbornyl, adamant-(1- or 2-)yl, and the like.

The term "cycloalkenyl" refers to a non-aromatic mono- or multicyclic ring system of about 3 to about 10 carbon atoms, preferably of about 5 to about 10 carbon atoms, and which contains at least one carbon-carbon double bond. Preferred ring sizes of rings of the ring system include about 5 to about 6 ring atoms. Exemplary monocyclic cycloalkenyl include cyclopentenyl, cyclohexenyl, cycloheptenyl, and the like. An exemplary multicyclic cycloalkenyl is norbornylenyl.

The term "aryl" as used herein, refers to an aromatic monocyclic or multicyclic ring system of about 6 to about 14 carbon atoms, preferably of about 6 to about 10 carbon atoms. Exemplary aryl groups include phenyl or naphthyl, or phenyl substituted or naphthyl substituted. In an embodiment, an aryl can include a biaryl, which refers to an aryl, as defined above, where two aryl groups are joined by a direct bond or through an intervening alkyl group, preferably a lower alkyl group.

The term "heteroaryl" is used herein to denote an aromatic ring or fused ring structure of carbon atoms with one or more non-carbon atoms, such as oxygen, nitrogen, and sulfur, in the ring or in one or more of the rings in fused ring structures. Examples are furanyl, pyranyl, thienyl, imidazyl, pyrrolyl, pyridyl, pyrazolyl, pyrazinyl, pyrimidinyl, indolyl, quinolyl, isoquinolyl, quinoxalyl, and quinazolinyl. Preferred examples are furanyl, imidazyl, pyranyl, pyrrolyl, and pyridyl.

The term "fused aryl" refers to a aryl multicyclic ring system as included in the term "aryl," and includes aryl groups and heteroaryl groups that are condensed. Examples are naphthyl, anthryl, and phenanthryl. The bonds can be attached to any of the rings.

General Discussion:

Embodiments of the present disclosure provide for multicomponent metal-organic materials (MOMs) that exhibit permanent porosity and using MOMs to separate components in a gas mixture, methods of separating polarizable gases (e.g., such as $CO_2$) from a gas mixture, and the like.

In an embodiment, the MOM can be porous and can be a three dimensional net so that molecules can be disposed (e.g., captured) within (e.g., pores or cavities) the MOM to the exclusion of other molecules. In an embodiment, the MOM combines sorption thermodynamics and kinetics to achieve advantageous results.

For example, a gas such as $CO_2$ is absorbed faster and stronger than other gases in the gas mixture, so that $CO_2$ can be captured in the MOMs to the substantial exclusion of the other gases. Other polarizable gases such as nitrogen and sulfur oxides, iodine, alkenes, acetylene, and krypton can also be captured in the MOMs to the substantial exclusion of other gases such as nitrogen, oxygen, methane, and water vapor. These improved performance results are unexpected when compared to the MOM analogs and these MOMS are useful with respect to separations/capture of polarizable gases (especially $CO_2$), in particular, in the presence of water vapor.

In an embodiment, the MOM can be used to separate $CO_2$ from one or more other gases. In particular, embodiments of the present disclosure can be used in $CO_2$ capture, gas separation, and the like, in post-combustion systems (e.g., flue gas to separate $CO_2$ and $N_2$), pre-combustion systems (e.g., shifted synthesis gas stream to separate $CO_2$ and $H_2$), and/or natural gas upgrading (e.g., natural gas cleanup to separate $CO_2$ and $CH_4$). In an embodiment, the MOMs can be used to separate other gases and can be used in processes such as He separation from natural gas, Ar separation, Kr separation, $H_2/D_2$ separation, iodine separation, and separation of unsaturated hydrocarbons from saturated hydrocarbons.

In an embodiment, the components of the MOM can be selected to design a MOM that can be used in a system or method that is highly effective at separating gases due to the MOM having a higher relative affinity for one polarizable component of the gas (e.g., $CO_2$) over one or more other components (e.g., $H_2O$, $N_2$, $H_2$, and $CH_4$) in the gas.

Embodiments of the present disclosure provide for MOMs that are three dimensional nets that have a primitive cubic topology that can be used in methods and systems of the present disclosure. In an embodiment, the MOM can include a metal organic framework that is based upon square grid networks that are pillared in the third dimension. In an embodiment, the MOM can be $Cu(4,4'-4,4'bipyridine)_2(TiF_6)]_n$, where n is 1 to $10^{18}$ or $[Cu(4,4'-bipyridine)_2(SnF_6)]_n$, wherein n is 1 to $10^{18}$.

In an embodiment, the two dimensional square grids include metal cations, metal cluster molecular building blocks (MBBs), or metal-organic polyhedral supermolecular building blocks (SBBs). The MBBs or SBBs serve the geometric role of the node in a network and they are connected by organic molecules, inorganic anions and/or metal complexes, which serve as linkers. The two dimensional square grids are connected to one another using other linkers or pillars that connect to the metal nodes. In an embodiment, the components of the MOM (the two dimensional square grids, and its components, and pillars) can be selected to design a MOM that can be used in a system or method, and is highly effective at separating gases due to the MOM having a higher relative affinity for one component of the gas (e.g., $CO_2$) over one or more other components (e.g., $H_2O$, $N_2$, $H_2$, and $CH_4$) in the gas.

In an embodiment, a method of the present disclosure includes exposing a gas to a MOM as described herein. As noted above, the MOM has a greater relative affinity for a first component of the gas over a second component of the gas. The phrase "greater relative affinity" or similar phrases mean that a MOM will interact with a first component much more strongly than a second component so that the MOM and the first component interact to the substantial exclusion of the second component (e.g., $H_2O$, $N_2$, $H_2$, and $CH_4$). In an embodiment, the affinity can be controlled by linkers in the MOM that exhibit strong enough electrostatic potential to induce polarization in one component of the gas. Thus, the first component can be captured (e.g., separated) from the gas mixture to form a modified gas, where the modified gas includes the second component and a substantially reduced amount (e.g., greater than about 80% or more, about 90% or more, about 95% or more, about 99% or more, about 99.9% or more, removal of the first component from the gas) of the first component.

In an embodiment, the gas can include two or more components. In an embodiment, the component can include one or more of the following: $CO_2$, $N_2$, $H_2$, $CH_4$, He, $H_2O$, hydrocarbons having 2 or more carbons (saturated or unsaturated and/or linear or branched), and a combination thereof. In an embodiment, $CO_2$ can be in the gas in an amount of about 400 ppm to 50%. In an embodiment, $N_2$ can be in the gas in an amount of about 50% to 99.99%. In an embodiment, $H_2$ can be in the gas in an amount of about 5% to 99.99%. In an embodiment, $CH_4$ can be in the gas in an amount of about 50% to 99.99%. In an embodiment, He can be in the gas in an amount of about 0.01% to 99.99%.

It should be noted that in many situations, the gas may primarily include a few components or only a few components that are important to the desired separation. For example, in post-combustion systems such as one that contains flue gas, the two main components (e.g., in the presence of water vapor) for separation are $CO_2$ and $N_2$. In another example, in pre-combustion systems such as shifted synthesis gas streams, the two main components to separate are $CO_2$ and $H_2$. In another embodiment, in natural gas upgrading systems such as natural gas cleanup, the two main components to separate are $CO_2$ and $CH_4$. In another embodiment, in a He separation system, the two main components to separate are He and natural gas.

In an embodiment, the components in a gas can be separated using a system to introduce the gas to the MOM and remove the modified gas. In an embodiment, a first structure or device including the MOM can be interfaced with a second structure or device to introduce a gas to the first structure so that the gas and the MOM can interact so that the MOM can capture the first component (e.g., $CO_2$). After a sufficient period of time and under appropriate temperature conditions, the remaining gas or modified gas can be removed from the first structure. This process can be repeated as appropriate for the particular system. After a period of time, the first component can be removed from the MOM and the MOM can be reused and/or recycled using an appropriate gas handling system.

In an embodiment, the first structure and the second structure can include those used in systems such as post-combustion systems, pre-combustion systems, natural gas upgrading systems, and He separation systems. In particular, the first structure can include structures such as those used in typical systems mentioned above. In an embodiment, the second structure can include standard gas handling systems, valves, pumps, flow meters, and the like.

As mentioned above, the separation method or system using the MOMs can be used to selectively remove $CO_2$ from $N_2$, $H_2$, $H_2O$, and/or $CH_4$. In an embodiment, the selectivity for $CO_2/N_2$ can be about 100 or more, about 500 or more, about 1000 or more, or about 2000 or more, based on ideal absorbed solution theory (IAST) calculations (described in greater detail in the Example) and at conditions similar to those described in the Example. In an embodiment, the selectivity for $CO_2/N_2$ can be about 100 or more, about 500 or more, about 1000 or more, or about 2000 or more, based on breakthrough experiments (described in greater detail in the Example) and at conditions of similar to those described in the Example.

In an embodiment, the selectivity for $CO_2/H_2$ can be about 100 or more, about 500 or more, about 1000 or more, or about 2000 or more, based on IAST calculations and at conditions similar to those described in the Example. In an embodiment, the selectivity for $CO_2/H_2$ can be about 100 or more, about 500 or more, about 1000 or more, or about 2000 or more, based on breakthrough experiments (described in greater detail in the Example) and at conditions of similar to those in the Example.

In an embodiment, the selectivity for $CO_2/CH_4$ can be about 10 or more, about 100 or more, about 500 or more, about 1000 or more, or about 2000 or more, based on based on IAST calculations and at conditions of similar to those described in the Example. In an embodiment, the selectivity for $CO_2/CH_4$ can be about 10 or more, 100 or more, about 500 or more, about 1000 or more, or about 2000 or more, based on breakthrough experiments (described in greater detail in the Example) and at conditions of similar to those described in the Example.

As noted above, MOMs can be three dimensional nets that can have a primitive cubic topology but they could also exhibit a different topology. In an embodiment, the MOM can be designed and synthesized using two dimensional square nets that are linked via metal nodes using a molecule or ion that serves the role of a pillar. In an embodiment, the two dimensional square nets can include metal cations, MBBs, or SBBs, and linkers can be used to bond the metal ions and the MBB and the SBB.

In an embodiment, MOMs can have the following generic structure: $(M(L)_a(P)_n)$, where M is the metal ion, L is the linker, and P is the pillar, a is 2 and n is 1. L and P can be difunctional ligands that are capable of linking the metal clusters or ions.

In an embodiment, the MOMs exhibit structures that can be described as primitive cubic (pcu) networks and are of general formula $[ML_2(TIFSIX)]_n$, where n can be 1 to $10^{18}$. In an embodiment, M can be a divalent or trivalent metal. In an embodiment, M can be one of the following: $Cu^{2+}$, $Zn^{2+}$, $Co^{2+}$, $Ni^{2+}$, $Mn^{2+}$, $Zr^{2+}$, $Fe^{2+}$, $Ca^{2+}$, $Ba^{2+}$, $Pb^{2+}$, $Pt^{2+}$, $Pd^{2+}$, $Ru^{2+}$, $Rh^{2+}$, $Cd^{2+}$, $Mg^{+2}$, $Al^{+3}$, $Fe^{+2}$, $Fe^{+3}$, $Cr^{2+}$, $Cr^{3+}$, $Ru^{2+}$, $Ru^{3+}$ and $Co^3$. In an embodiment, L can be a bifunctional linker molecule based upon two nitrogen donor moieties as illustrated in FIGS. 12-16. In an embodiment, TIFSIX (P) can be a linear pillar such as hexafluorotitanate, hexafluorostannate, or hexafluorosilicate.

Figure 14:
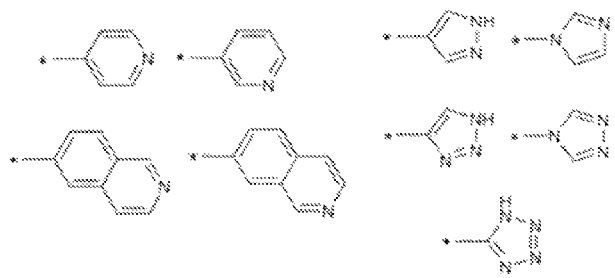
Figure 15:
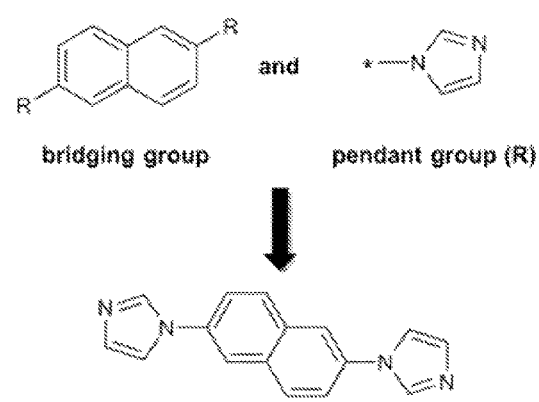

In an embodiment, the bifunctional, N-donor linker ligands, L, can be divided into two subsets (denoted herein as Subsets I and II). In an embodiment, Subset I (e.g., FIG. 13) can include linker ligands containing one bridging group (BG) and two N-donor pendant groups (PGs; denoted as R in FIG. 13 and in FIGS. 14 and 16). In an embodiment, BG (FIG. 14) may be: 1) a monocyclic or fused-polycyclic aromatic system, 2) non-aromatic, or 3) absent. In an embodiment, two PGs (FIG. 13) can be attached by a covalent bond to each end of the BG (FIG. 14). When BG is absent, two PGs can be attached directly to each other via a covalent bond (e.g., two 4-pyridyl PGs combine to form 4,4'-bipyridine).

Figure 16:
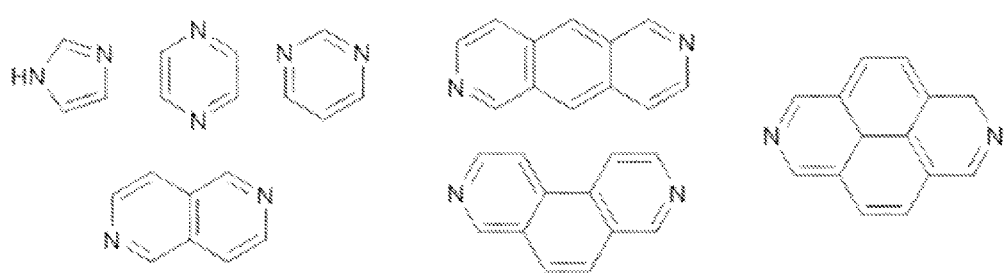

In an embodiment, subset II can include linker ligands that contain two coordinating N-donor moieties that are integrated into a single monocyclic or polycyclic aromatic system (FIG. 16).

In an embodiment, both subset I and subset II (FIGS. 12-16), one or more of the hydrogen atoms of L (e.g., BG, LG, etc) can be independently substituted by non-coordinating groups such as halogens, a substituted or unsubstituted aliphatic group, a substituted or unsubstituted alkyl, a substituted or unsubstituted cycloalkyl, a substituted or unsubstituted alkenyl, a substituted or unsubstituted cycloalkenyl, a substituted or unsubstituted alkynyl, a substituted or unsubstituted aryl, a halo group, or a substituted or unsubstituted araalkyl, and functional groups containing carbonyl groups such as esters, amides, aldehydes and ketones, each of which can be substituted or unsubstituted.

In an embodiment, the MOM can include: $[Cu(4,4'-bipyridine)_2(TiF_6)]_n$, where n is 1 to $10^{18}$; and $[Cu(4,4'-bipyridine)_2(SnF_6)]_n$, wherein n is 1 to $10^{18}$.

Water vapor is a problem with most porous materials because it interacts strongly through chemical bonding to unsaturated metal centers or moderately through hydrogen bonding if there are hydrogen bonding sites. Porous materials that have amines grafted to their pores (for chemical bonding with $CO_2$) also tend to react with water vapor. Embodiments of the present disclosure describe MOMs that have no unsaturated metal centers and the pore walls have no or weak hydrogen bonding donors or acceptors, while having strong electrostatics for inducing dipoles in polarizable molecules such as $CO_2$. In short, embodiments of the present disclosure have enhanced $CO_2$ interactions at the same time we have reduced interactions with water vapor.

In an embodiment, because the MOMs contain no unsaturated metal centers or strong hydrogen bonding sites, they can be used in methods and systems that use gases that include water vapor, which was not previously possible in porous materials that exhibit strong physisorption towards $CO_2$. This is advantageous because other systems and methods that use other MOMs or other porous materials must separate water vapor from the gas prior to the gas being introduced to the other MOMs or porous materials since the other MOMs or porous materials have a higher affinity for the water vapor than $CO_2$. If the water vapor is not removed, the other MOMs are not effective at removing $CO_2$. Embodiments of the systems and methods can be simplified and result in reduced expenditure since the water vapor does not have to be removed prior to introduction to the MOMs. Even in the presence of water vapor, MOMs used in embodiments of the present disclosure are more effective at removing $CO_2$ and are highly selective in separating $CO_2$ from other gases such as $N_2$, $H_2$, and/or $CH_4$.

As described herein, a substantial advantage of embodiments of the present disclosure is that methods and systems using the MOMs can be conducted using a gas having water vapor, which is a completely unexpected result since other MOMs and related inorganic porous materials are typically hydrophilic and have a strong affinity for water so that the water vapor needs to be substantially or completely removed from the gas for the MOM to be commercially viable. In an embodiment, the water vapor in the gas can be at a concentration of about 1% to 10% at a temperature of about 273K to 340K.

EXAMPLE

Now having described the embodiments of the present disclosure, in general, the Examples describe some additional embodiments of the present disclosure. While embodiments of present disclosure are described in connection with the Examples and the corresponding text and figures, there is no intent to limit embodiments of the present disclosure to these descriptions. On the contrary, the intent is to cover all alternatives, modifications, and equivalents included within the spirit and scope of embodiments of the present disclosure.

Example 1

Brief Introduction

Pillar substitution in a long-known metal-organic material with saturated metal centres, $[Cu(bipy)_2(SiF_6)]_n$, has afforded the first porous materials based upon the of $TiF_6^{2-}$ and $SnF_6^{2-}$ anions as pillars. Gas adsorption studies revealed similar surface areas and adsorption isotherms to their $SiF_6^{2-}$ analogs but unexpectedly they also exhibit enhanced selectivity towards $CO_2$ vs. $CH_4$ and other gases Discussion:

Our increasing dependence on carbon based fuels and the impact of such fuels on climate change has spurred interest in developing efficient carbon capture technologies. $CO_2/CH_4$ and $CO_2/N_2$ separations, aimed at natural gas purification and post-combustion carbon capture, respectively, have therefore become a primary research objective in the field of porous metal organic materials, MOMs.[1] The potential for high permanent porosity coupled with structural tunability means that MOMs[2,3] are particularly suited to elucidate the structural features that promote selective $CO_2$ adsorption. MOM platforms, families of related MOMs with modular components, are ideally suited in this context as they facilitate tailoring of pore size and functionality to selectively target a chosen adsorbate.

Structural tuning in MOM platforms can be accomplished through variation of framework composition, e.g., metal node, linker or, if appropriate, extra-framework ion. In the context of adsorption, platforms can be conveniently divided into those with unsaturated metal centres (UMCs) and those with saturated metals centers (SMCs). Versatile platforms containing UMCs include those sustained by $[M_2(\mu-CO_2)_4]$ square paddlewheels (e.g. rht[4] and tbo[5] nets), $[M_3(\mu-CO_2)_6(\mu^3-O)]$ trigonal prisms (e.g. MIL-100/101[6,7]), and infinite $[O_2M_2](CO_2)_2$ rods (e.g. $[M_2(dobdc)]^{8,9}$). Platforms with SMCs include ZIFs (zeolitic imidazolate frameworks[10]) and pillared sheets,[11,12] of which pillared bipyridyl and dicarboxylate grids are subclasses. Pillared sheets based upon octahedral nodes and two different linkers are readily fine-tunable; one linker generates the sheets, while the other (the pillar) cross-links the sheets through axial metal sites to form a pcu net with square channels. Early reports of pillared sheet MOMs include those based upon $SiF_6^{2-}$ pillars, 4,4'-bipyridine (bipy) linkers, and either $Zn(II)^{11a}$ or $Cu(II)^{12}$, while an interpenetrated variant, $[Zn(bipy)_2(H_2O)_2]^{2+}$ was one of the first examples of a 3D MOM.[13]

MOMs with UMCs such as $[Mg_2(dobdc)]$ can bind $CO_2$ with high selectivity via chemisorption, but $Q_{st}$ (heat of adsorption) often drops sharply after the UMCs become saturated. In addition, water, which composes ca. 6% of flue gas, strongly competes with $CO_2$ for UMCs and may thereby diminish separation performance in a humid environment.[14] In light of these matters, MOMs with SMCs that rely upon selective physisorption are an appealing alternative which can afford the benefit of lower activation and regeneration temperatures.

Recently we reported that a previously known MOM[12] containing $SiF_6^{2-}$ pillars, $[Cu(bipy)_2(SiF_6)]_n$, SIFSIX-1-Cu, displays high $CO_2$ uptake and selectivity at all loadings.[15] An expanded variant, $[Cu(bipe)_2SiF_6]_n$ (bipe=1,2-bis(4-pyridyl)ethylene), also exhibits high $CO_2$ selectivity despite having significantly larger pores and surface area. Importantly, both compounds exhibit considerably lower $H_2O$ uptake compared to MOMs with UMCs.

Figure 4:
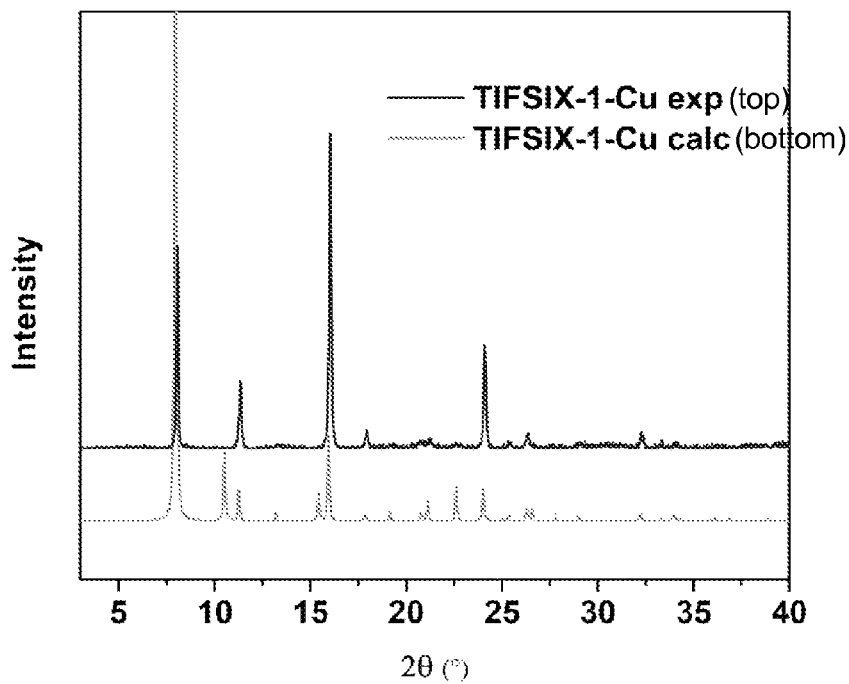
FIG. 4 illustrates experimental and Calculated PXRD patterns for TIFSIX-1-Cu.
Figure 5:
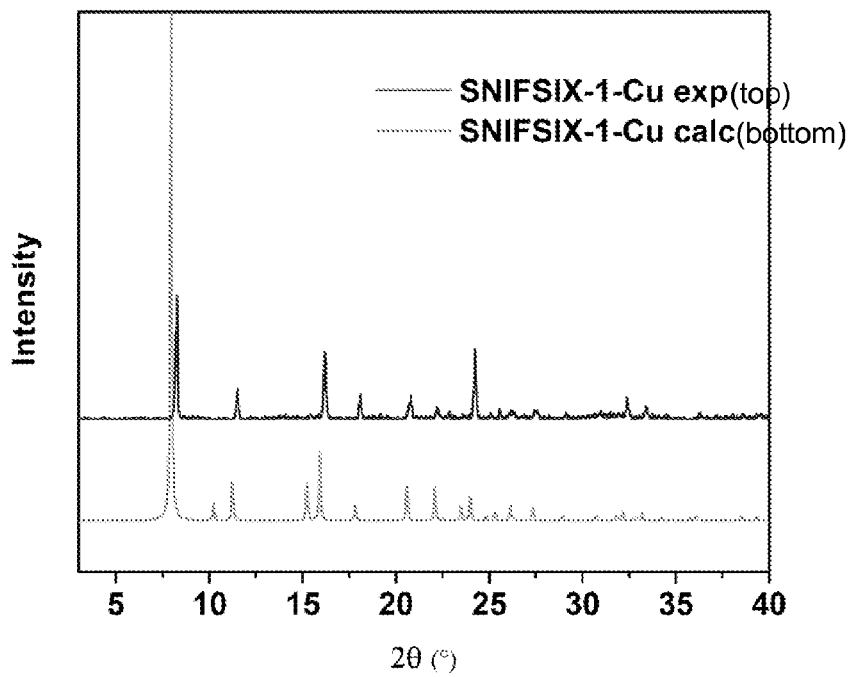
FIG. 5 illustrates experimental and Calculated PXRD patterns for SNIFSIX-1-Cu.

Herein we report synthesis, structure, and gas adsorption properties of two variants of SIFSIX-1-Cu, $[Cu(bipy)_2TiF_6]_n$ (TIFSIX-1-Cu) and $[Cu(bipy)_2SnF_6]_n$ (SNIFSIX-1-Cu), the first examples of 3D nets based upon the respective pillars. Room temperature diffusion of a methanol solution of bipy into an ethylene glycol solution of $Cu(NO_3)_2 \cdot 2.5H_2O$ and $(NH_4)_2MF_6$ (M=Ti or Sn) afforded purple plates of TIFSIX-1-Cu and SNIFSIX-1-Cu in 90.2 and 93.8% yield, respectively. Single crystal x-ray diffraction (Table 1) revealed that TIFSIX-1-Cu and SNIFSIX-1-Cu are isostructural to SIFSIX-1-Cu, all crystallizing in P4/mmm as a pcu net with $Cu^{2+}$ cations bonded to 4 equatorial bipy linkers and pillared in the axial direction by $TiF_6^{2-}$ or $SnF_6^{2-}$ moieties. PXRD patterns of as-synthesized TIFSIX-1-Cu and SNIF-SIX-1-Cu match those calculated from single crystal data (FIGS. 4 and 5).

The bipy linkers and nodes in TIFSIX-1-Cu and SNIF-SIX-1-Cu form square grid sheets[13,16] parallel to the a and b axes which are pillared along the c axis (FIG. 1), thereby forming a neutral framework with ca. 8 Å×8 Å square channels (accounting for van der Waal's radii). The Cu-bipy-Cu distances in TIFSIX-1-Cu and SNIFSIX-1-Cu nearly equal that of SIFSIX-1-Cu (11.10, 11.12, and 11.11 Å, respectively) whereas the Cu-pillar-Cu distances increase slightly with the size of the pillar metal (8.41, 8.63, and 8.11 Å, respectively).

Thus, the large channels of SIFSIX-1-Cu, TIFSIX-1-Cu and SNIFSIX-1-Cu have nearly equal dimensions while the intersheet distance increases only marginally as the metal increases in size. The isostructurality of SIFSIX-1-Cu, TIFSIX-1-Cu, SNIFSIX-1-Cu enabled us to investigate the effects of the pillar on $CO_2$ capacity/selectivity and trace any differences to the electrostatics of the pillars.

Figure 6:
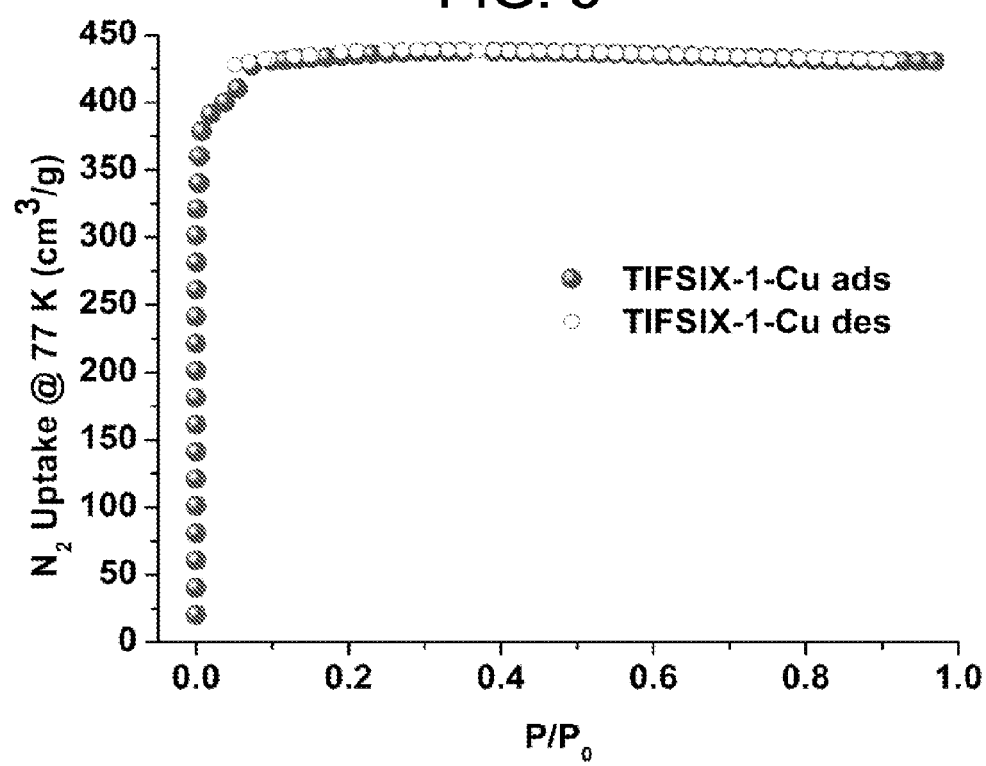
FIG. 6 illustrates an $N_2$ isotherm at 77K for TIFSIX-1-Cu.
Figure 7:
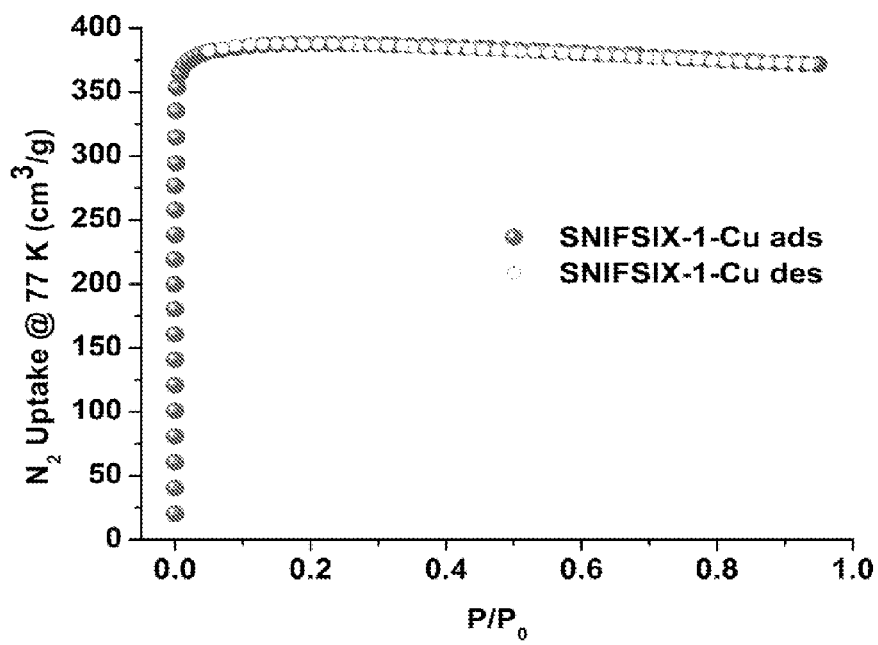
FIG. 7 illustrates $N_2$ isotherm at 77K for SNIFSIX-1-Cu.

Solvent-exchanged samples of TIFSIX-1-Cu and SNIFSIX-1-Cu were evacuated at room temperature and $N_2$ isotherms were recorded at 77 K, revealing reversible type I adsorption corresponding to BET surface areas of 1690 and 1523 m$^2$/g, respectively (FIGS. 6 and 7). Interestingly, the gravimetric surface areas of TIFSIX-1-Cu and SNIFSIX-1-Cu surpass that of SIFSIX-1-Cu although they contain heavier pillar metals.

Figure 2:
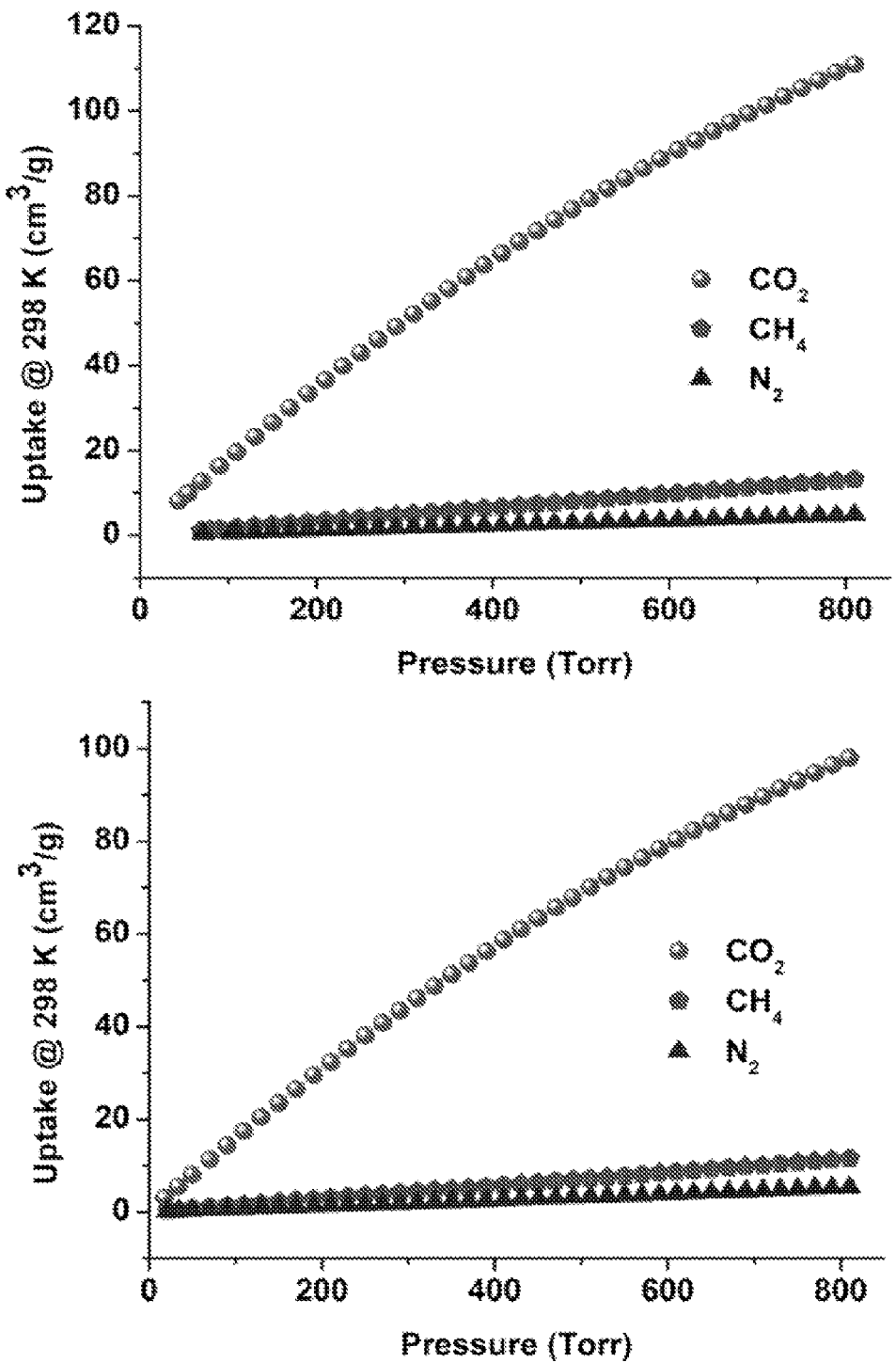
FIG. 2 illustrates $CO_2$, $CH_4$, and $N_2$ isotherms at 298 K for TIFSIX-1-Cu (above) and SNIFSIX-1-Cu (below).
Figure 8:
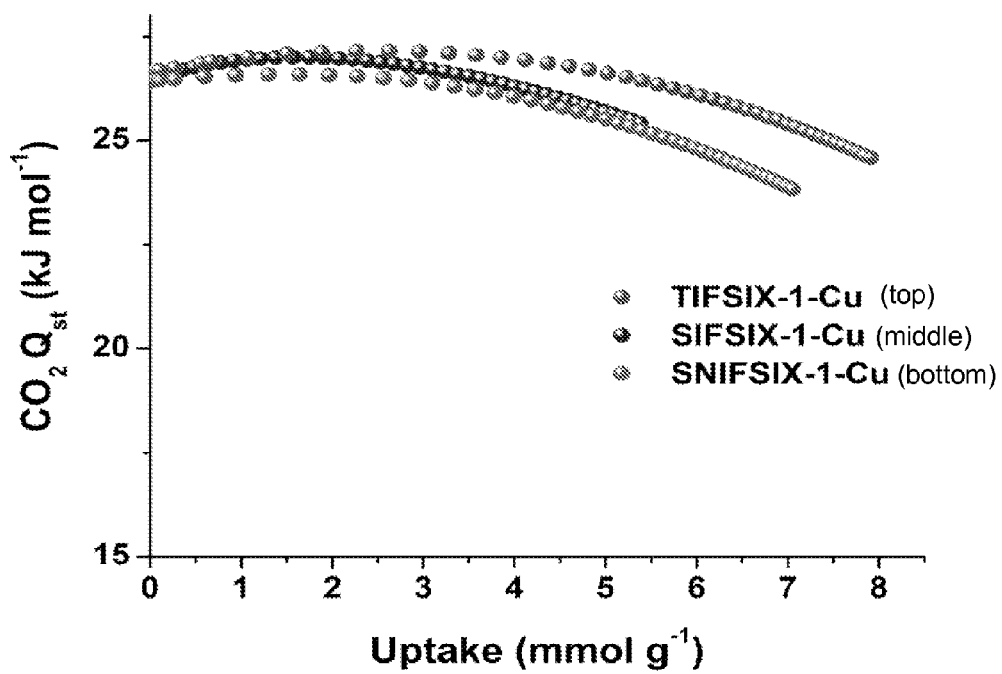
FIG. 8 illustrates $CO_2 Q_{st}$ for TIFSIX-1-Cu, SIFSIX-1-Cu, and SNIFSIX-1-Cu, determined by the virial method.

To evaluate the separation performance of TIFSIX-1-Cu and SNIFSIX-1-Cu in the context of carbon capture and natural gas upgrading, single component $CO_2$, $CH_4$, and $N_2$ isotherms were collected at 298 K up to 1 atm (FIG. 2). A summary of sorption data along with a comparison to SIFSIX-1-Cu is presented in Table S2. At 1 atm, the $CO_2$ uptakes of TIFSIX-1-Cu and SNIFSIX-1-Cu were measured to be 106.3 and 93.9 cm$^3$/g, respectively. A literature survey reveals just 12 MOMs with gravimetric $CO_2$ uptake higher than TIFSIX-1-Cu under these conditions (Table 3). Of these MOMs, SIFSIX-1-Cu is the only one based upon SMCs. At 0.15 atm, the partial pressure of $CO_2$ in post combustion flue streams, the $CO_2$ uptakes of TIFSIX-1-Cu and SNIFSIX-1-Cu are 20.4 and 18.0 cm$^3$/g, respectively. The uptake exhibited by TIFSIX-1-Cu at this pressure is superior to that of SIFSIX-1-Cu (18.1 cm$^3$/g), indicating stronger sorbent-sorbate interaction at low loading upon substitution of Si with Ti. The $Q_{st}$ for each compound was determined by applying the virial method to the isotherms at 273 and 298 K (FIG. 8). Both MOMs exhibit a $CO_2 Q_{st}$ of ca. 26.5 kJ/mol at zero loading, which is nearly the same as SIFSIX-1-Cu 1 and is high with respect to MOMs without UMCs or amine functionality.[1] As loading increases, the $Q_{st}$ of TIFSIX-1-Cu surpasses that of SIFSIX-1-Cu, which presumably reflects stronger interaction between $CO_2$ and the TiF$_6^{2-}$ pillars.

Similarly to SIFSIX-1-Cu, the uptakes of $CH_4$ and $N_2$ in TIFSIX-1-Cu and SNIFSIX-1-Cu are substantially lower than the respective $CO_2$ uptakes ($CH_4$: 12.4 and 10.8 cm$^3$/g; $N_2$: 4.5 and 5.0 cm$^3$/g), which prompted us to compare their predicted separation performance by from $CO_2/CH_4$ relative uptake at 1 atm. The $CO_2/CH_4$ relative uptake of MOMs TIFSIX-1-Cu and SNIFSIX-1-Cu, defined by the $CO_2/CH_4$ uptake ratio at 1 atm and 298 K, are 8.6 and 8.7, respectively.

Figure 3:
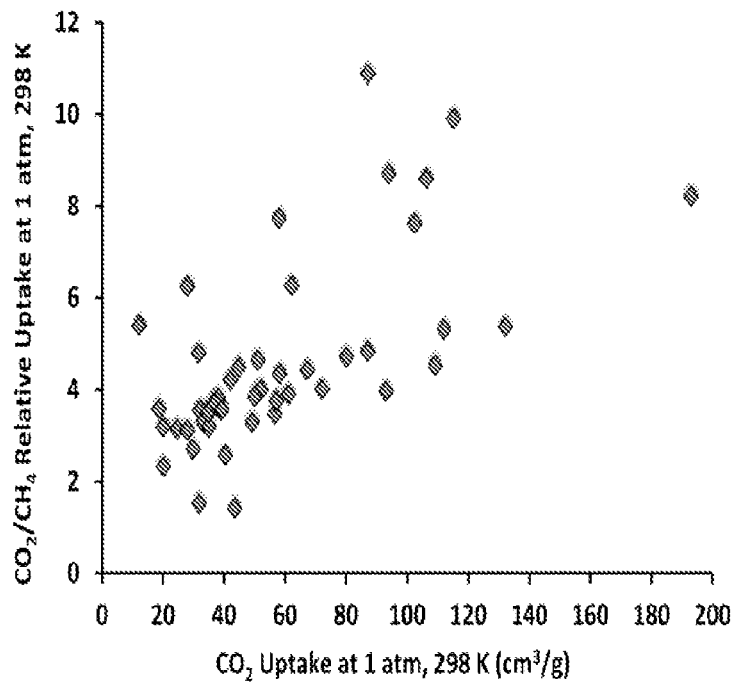
FIG. 3 illustrates comparison of $CO_2/CH_4$ relative uptakes and gravimetric $CO_2$ uptakes of MOMs in the literature (green) to those reported herein (pink).
Figure 9:
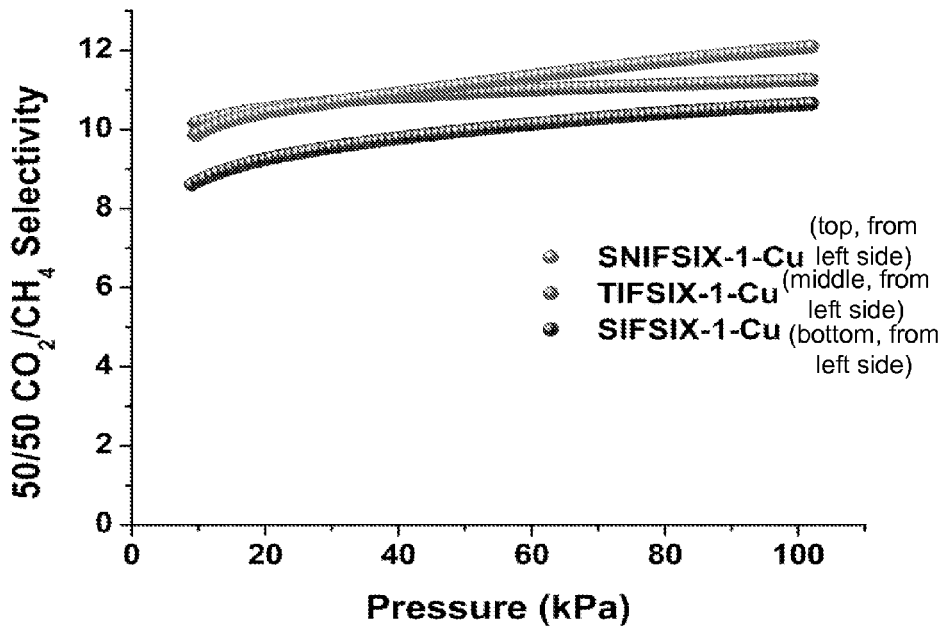
FIG. 9 illustrates 50/50 $CO_2/CH_4$ IAST selectivities of TIFSIX-1-Cu, SIFSIX-1-Cu, and SNIFSIX-1-Cu at 298 K.

These values are slightly below that of SIFSIX-1-Cu (9.9) but greater than the vast majority of MOMs. We note that upon plotting $CO_2/CH_4$ relative uptake against $CO_2$ capacity we found that SIFSIX-1-Cu, TIFSIX-1-Cu and SNIFSIX-1-Cu lie near the top of both categories among reported MOMs (FIG. 3, Table 4). In other words, high $CO_2/CH_4$ relative uptake does not compromise $CO_2$ capacity in this platform. We have also modeled interactions between $CO_2$ and the pillars (FIG. 11) and conducted a series of IAST[17] calculations (FIG. 9). The IAST calculations predict the 50/50 $CO_2/CH_4$ and 10/90 $CO_2/N_2$ mixture selectivity of SIFSIX-1-Cu, TIFSIX-1-Cu and SNIFSIX-1-Cu at 298 K from the pure component isotherms. The trend in $CO_2/CH_4$ IAST selectivity differs from the trend in relative uptakes, with TIFSIX-1-Cu and SNIFSIX-1-Cu exhibiting greater selectivity than SIFSIX-1-Cu over the full pressure range. At 1 atm, SNIFSIX-1-Cu was calculated as having the highest selectivity (12.1), followed by TIFSIX-1-Cu (11.2) and SIFSIX-1-Cu (10.6). The selectivity of SNIFSIX-1-Cu at 1 atm supersedes that of most MOMs without UMCs including all ZIFs, MOF-5, UMCM-1, MIL-53(Al), and MOF-177 as well as MOMs with UMCs such as HKUST-1 and MIL-101(Cr) (Table S5). [Zn(bdc)(dabco)$_{0.5}$], a structurally related MOM with similar pore size and organic pillars, has a selectivity of ca. 3.4.[18,19] A rare example of a MOM without UMCs having higher selectivity (ca. 36) is UTSA-16,[19,20] however this material has much smaller pores (3.3× 5.4 Å$^2$) which may allow for size exclusion of $CH_4$.

Figure 10:
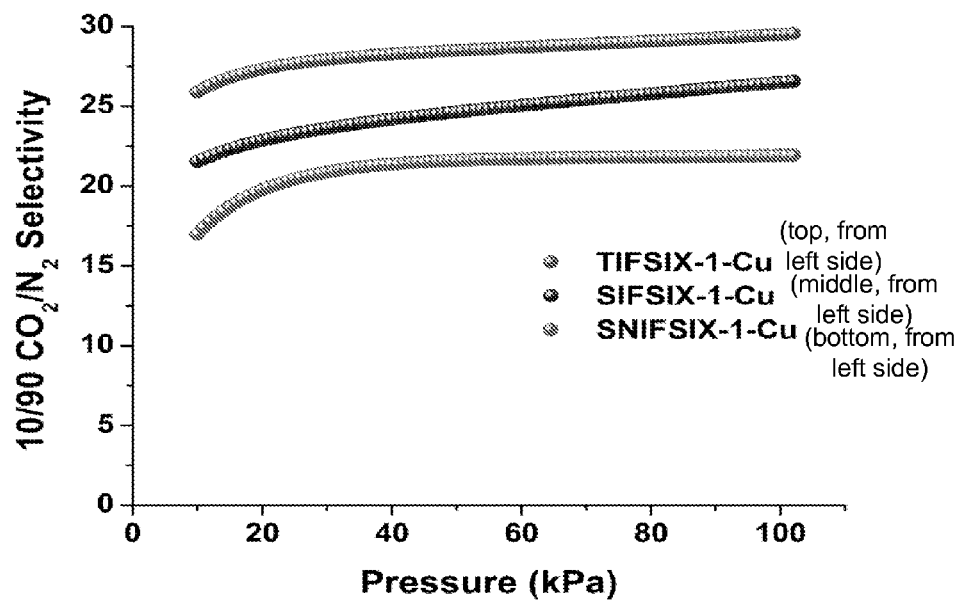
FIG. 10 illustrates 10/90 $CO_2/N_2$ IAST selectivities of TIFSIX-1-Cu, SIFSIX-1-Cu, and SNIFSIX-1-Cu at 298 K.

The $CO_2/N_2$ IAST selectivity calculations (FIG. 10) predict that TIFSIX-1-Cu has significantly higher $CO_2/N_2$ separation capability than SIFSIX-1-Cu up to 1 atm. At 1 atm, the sequence of selectivities is TIFSIX-1-Cu>SIFSIX-1-Cu>SNIFSIX-1-Cu (29.5, 26.5, and 21.9, respectively). As with the enhancements in 0.15 atm $CO_2$ uptake and $Q_{st}$, we attribute the increase in $CO_2/N_2$ selectivity in TIFSIX-1-Cu relative to SIFSIX-1-Cu to be attributable to replacement of SiF$_6^{2-}$ by TiF$_6^{2-}$.

CONCLUSIONS

We detail herein the modification of a long-known MOM platform to generate two variants, TIFSIX-1-Cu and SNIFSIX-1-Cu, which represent the first 3D nets containing TiF$_6^{2-}$ and SnF$_6^{2-}$ moieties, respectively. Like SIFSIX-1-Cu, these MOMs are synthesized and activated at room temperature from low cost, commercially available starting materials and exhibit high $CO_2$ capacity and selectivity under ambient conditions relative to all other MOMs with SMCs. All three variants have exceptional $CO_2/CH_4$ relative uptake and $CO_2$ uptake at 298 K and 1 atm. Furthermore, although TIFSIX-1-Cu and SNIFSIX-1-Cu exceed SIFSIX-1-Cu in surface area, tuning of the pillaring functionality affords enhancements in $CO_2/CH_4$ and/or $CO_2/N_2$ selectivity. This study further implies that certain inorganic anions can be comparable to UMCs in terms of their affinity for $CO_2$ but without some of the drawbacks associated with UMCs. In particular, coupling high $CO_2$ capacity and selectivity with a physisorptive mechanism represents a promising alternative to those MOMs which rely upon chemisorption.

REFERENCES, EACH OF WHICH IS INCORPORATED HEREIN BY REFERENCE

1 K. Sumida, D. L. Rogow, J. A. Mason, T. M. McDonald, E. D. Bloch, Z. R. Herm, T. H. Bae and J. R. Long, *Chem. Rev.*, 2012, 112, 724.

2 S. R. Batten, S. M. Neville and D. R. Turner, *Coordination Polymers: Design, Analysis and Application*, Royal Society of Chemistry, Cambridge, 2009.

3 L. R. MacGillivray, *Metal-Organic Frameworks: Design and Application*, John Wiley & Sons, Hoboken, 2010.

4 F. Nouar, J. F. Eubank, T. Bousquet, L. Wojtas, M. J. Zaworotko and M. Eddaoudi, *J. Am. Chem. Soc.*, 2008, 130, 1833.

5 S. S. Y. Chui, S. M. F. Lo, J. P. H. Charmant, A. G. Orpen and I. D. Williams, *Science*, 1999, 283, 1148.

6 G. Férey, C. Mellot-Draznieks, C. Serre, F. Millange, J. Dutour, S. Surblé and I. Margiolaki, *Science*, 2005, 309, 2040.

7 G. Férey, C. Serre, C. Mellot-Draznieks, F. Millange, S. Surblé, J. Dutour and I. Margiolaki, *Angew. Chem. Int. Ed.*, 2004, 43, 6296.

8 N. L. Rosi, J. Kim, M. Eddaoudi, B. Chen, M. O'Keeffe and O. M. Yaghi, *J. Am. Chem. Soc.*, 2005, 127, 1504.

9 S. R. Caskey, A. G. Wong Foy and A. J. Matzger, *J. Am. Chem. Soc.*, 2008, 130, 10870.

10 R. Banerjee, A. Phan, B. Wang, C. Knobler, H. Furukawa, M. O'Keeffe and O. M. Yaghi, *Science*, 2008, 319, 939.

11(a) S. Subramanian and M. J. Zaworotko, *Angew. Chem. Int. Ed.* 1995, 34, 2127.

(b) K. Biradha, M. Sarkar and L. Rajput, *Chem. Commun.*, 2006, 4169-4179.

(c) M. J. Lin, A. Jouaiti, N. Kyritsakas and M. W. Hosseini, *CrystEngComm*, 2011, 13, 776-778.

12 S. Noro, S. Kitagawa, M. Kondo and K. Seki, *Angew. Chem. Int. Ed.*, 2000, 39, 2081.

13 R. W. Gable, B. F. Hoskins and R. Robson, *J. Chem. Soc., Chem. Commun.*, 1990, 1677.

14 A. C. Kizzie, A. G. Wong Foy and A. J. Matzger, *Langmuir*, 2011, 27, 6368.

15 S. D. Burd, S. Ma, J. A. Perman, B. J. Sikora, R. Q. Snurr, P. K. Thallapally, J. Tian, L. Wojtas and M. J. Zaworotko, *J. Am. Chem. Soc.*, 2012, 134, 3663.

16 L. Carlucci, G. Ciani and D. M. Proserpio, *New J. Chem.*, 1998, 22, 1319.

17 A. L. Myers and J. M. Prausnitz, *AlChE J.*, 1965, 11, 121.

18 D. N. Dybtsev, H. Chun and K. Kim, *Angew. Chem. Int. Ed.*, 2004, 43, 5033.

19 S. Xiang, Y. He, Z. Zhang, H. Wu, W. Zhou, R. Krishna and B. Chen, *Nat. Commun.*, 2012, 3, 954.

20 S. Xiang, X. Wu, J. Zhang, R. Fu, S. Hu and X. Zhang, *J. Am. Chem. Soc.*, 2005, 127, 16352.

Information for Example 1:

Materials and Methods:

All reagents and solvents were commercially available and used without further purification.

Single crystal X-ray diffraction data for TIFSIX-1-Cu and SNIFSIX-1-Cu were collected on a Bruker-AXS SMART APEX/CCD diffractometer using CuKα radiation ($\lambda$=1.5418 Å, T=228(2) K). Indexing was performed using APEX2.[1] Data integration and reduction were completed using SaintPlus 6.01.[2] Absorption correction was performed by the multi-scan method implemented in SADABS.[3] Space groups were determined using XPREP implemented in APEX2.[1] Structures were solved with SHELXS-97[5-7] (direct methods), and refined on $F^2$ using nonlinear least-squares techniques with SHELXL-97 contained in APEX2, WinGX v1.70.01,[4-7] and OLEX2 v1.1.5[8] program packages. All non-hydrogen atoms were refined anisotropically. The Ti—F bond distances for disordered F atoms in TIFSIX-1-Cu were refined using restraints. The pyridyl rings in both structures were disordered over two positions. For both structures the contribution of disordered solvent molecules was treated as diffuse using the Squeeze routine implemented in Platon.[9,10]

Powder X-ray diffraction (PXRD) was carried out at room temperature on a Bruker D8 Advance θ/2θ diffractometer using Cu-Kα radiation ($\lambda$=1.5418 Å). 2θ scans between 3° and 40° with a step size of 0.02° were performed for a duration of 30 minutes.

Gas adsorption measurements were conducted on a Micromeritics ASAP 2020 surface area and porosity analyzer. Prior to the measurements, 2 and 3 were exchanged with methanol 3 times daily for 2 days and degassed under high vacuum at room temperature for 16 hours.

Preparation of [Cu(Bipy)$_2$(TiF$_6$)], TIFSIX-1-Cu:

In a small test tube, 0.15 mmol (23.4 mg) of 4,4'-bipyridine in 3 mL of methanol was layered onto 3 mL of an ethylene glycol solution containing 0.076 mmol (17.7 mg) of Cu(NO$_3$)$_2$.2.5H$_2$O and 0.076 mmol (15.0 mg) of (NH$_4$)$_2$TiF$_6$. Purple plate-shaped crystals formed in 90.2% yield after 2 weeks.

Preparation of [Cu(Bipy)$_2$(SnF$_6$)], SNIFSIX-1-Cu:

In a small test tube, 0.11 mmol (17.2 mg) of 4,4'-bipyridine in 3 mL of methanol was layered onto 3 mL of an ethylene glycol solution containing 0.056 mmol (13.0 mg) of Cu(NO$_3$)$_2$.2.5H$_2$O and 0.056 mmol (15.1 mg) of (NH$_4$)$_2$SnF$_6$. Purple plate-shaped crystals formed in 93.8% yield after 2 weeks.

TABLE 1

Crystallographic Data for TIFSIX-1-Cu and SNIFSIX-1-Cu.

| Compound | TIFSIX-1-Cu | SNIFSIX-1-Cu |
|---|---|---|
| Empirical formula | $C_{20}H_{16}CuF_6N_4Ti$ | $C_{20}H_{16}CuF_6N_4Sn$ |
| Formula weight | 537.81 | 608.60 |
| Temperature/K | 228(2) | 228(2) |
| Crystal system | tetragonal | tetragonal |
| Space group | P4/mmm | P4/mmm |
| a/Å | 11.1001(6) | 11.116(5) |
| b/Å | 11.1001(6) | 11.116(5) |
| c/Å | 8.4055(7) | 8.627(5) |
| α/° | 90.00 | 90.00 |
| β/° | 90.00 | 90.00 |
| γ/° | 90.00 | 90.00 |
| Volume/Å$^3$ | 1035.66(12) | 1066.0(9) |
| Z | 1 | 1 |
| ρcalc/mg/mm$^3$ | 0.862 | 0.948 |
| m/mm$^{-1}$ | 2.593 | 5.587 |
| F(000) | 269.0 | 297.0 |
| Crystal size/mm$^3$ | 0.02 × 0.02 × 0.01 | 0.02 × 0.02 × 0.01 |
| 2Θ range for data collection | 10.52 to 132.64° | 7.96 to 133.06° |
| Index ranges | −13 ≤ h ≤ 13, −9 ≤ k ≤ 12, −9 ≤ l ≤ 8 | −13 ≤ h ≤ 12, −12 ≤ k ≤ 12, −9 ≤ l ≤ 10 |
| Reflections collected | 5175 | 5235 |
| Independent reflections | 573[R$_{(int)}$ = 0.0698] | 603[R$_{(int)}$ = 0.0557] |
| Data/restraints/parameters | 573/3/48 | 603/0/40 |
| Goodness-of-fit on F$^2$ | 1.054 | 1.188 |
| Final R indexes [I > = 2σ (I)] | R$_1$ = 0.0362, wR$_2$ = 0.1083 | R$_1$ = 0.0317, wR$_2$ = 0.0732 |
| Final R indexes [all data] | R$_1$ = 0.0385, wR$_2$ = 0.1095 | R$_1$ = 0.0328, wR$_2$ = 0.0748 |
| Largest diff. peak/hole/ e Å$^{-3}$ | 0.36/−0.39 | 0.69/−0.81 |

TABLE 2

Gas Adsorption Properties of MFSIX MOMs.

| MOM | SIFSIX-1-Cu | TIFSIX-1-Cu | SNIFSIX-1-Cu |
|---|---|---|---|
| Empirical formula | [Cu(SiF$_6$)(bipy)$_2$] | [Cu(TiF$_6$)(bipy)$_2$] | [Cu(SnF$_6$)(bipy)$_2$] |
| Pore volume (theoretical; cm$^3$/g) | 0.683 | 0.696 | 0.636 |
| BET surface area (m$^2$/g) | 1468 | 1690 | 1523 |
| BET surface area (m$^2$/cm$^3$) | 1261 | 1457 | 1444 |

TABLE 2-continued

Gas Adsorption Properties of MFSIX MOMs.

| MOM | SIFSIX-1-Cu | TIFSIX-1-Cu | SNIFSIX-1-Cu |
|---|---|---|---|
| $CO_2$ uptake (1 atm, 298 K; $cm^3/g$) | 115.2 | 106.3 | 93.9 |
| $CO_2$ uptake (1 atm, 298 K; $cm^3/cm^3$) | 99.0 | 91.6 | 89.0 |
| $CO_2$ uptake (0.15 atm, 298 K; $cm^3/g$) | 18.1 | 20.4 | 18.0 |
| $CO_2$ uptake (0.15 atm, 298 K; $cm^3/cm^3$) | 15.5 | 17.6 | 17.1 |
| $CO_2$ $Q_{st}$ (zero loading; kJ/mol) | 26.5 | 26.6 | 26.4 |
| $CO_2/CH_4$ relative uptake (1 atm, 298 K) | 9.9 | 8.6 | 8.7 |
| $CO_2/N_2$ relative uptake (1 atm, 298 K) | 28.1 | 23.6 | 18.8 |
| $CO_2/CH_4$ selectivity (50/50; 1 atm, 298 K) | 10.6 | 11.2 | 12.1 |
| $CO_2/N_2$ selectivity (10/90; 1 atm, 298 K) | 26.5 | 29.5 | 21.9 |

TABLE 3

Gravimetric $CO_2$ Uptake of Selected MOMs at 298 K and 1 atm.

| MOM | $CO_2$ Uptake @ 298 K, 1 atm ($cm^3/g$) | Reference |
|---|---|---|
| $Mg_2$(dobdc) | 193.0 | 11 |
| $Co_2$(dobdc) | 169.0 | 12 |
| $Ni_2$(dobdc) | 160.0 | 12 |
| $Fe_2$(dobdc) | 159.0 | 13 |
| Cu-TDPAT | 132.2 | 14 |
| HKUST-1 | 126.0 (a) | 15 |
| Cu-TPBTM | 118.5 | 16 |
| SIFSIX-1-Cu | 115.2 | 17 |
| UTSA-20 | 112.0 (b) | 18 |
| $Zn_2$(dobdc) | 109.8 | 19 |
| PCN-26 | 109.1 | 20 |
| $Mg_2$(dobpdc) | 108.6 | 21 |
| TIFSIX-1-Cu | 106.3 | This work |

(a) 293 K, 1.1 atm;
(b) 300 K.

TABLE 4

$CO_2/CH_4$ Relative Uptakes and $CO_2$ Uptakes at 298 K and 1 atm of MOMs Reported in the Literature (FIG. 3 plot).

| MOM | $CO_2/CH_4$ Relative Uptake | $CO_2$ Uptake ($cm^3$(STP)/g) | Reference |
|---|---|---|---|
| CUK-1 | 10.88 | 87.0 | 22 |
| SIFSIX-1-Cu | 9.90 | 115.2 | 23 |
| SNIFSIX-1-Cu | 8.70 | 93.9 | This work |
| TIFSIX-1-Cu | 8.60 | 106.3 | This work |
| $Mg_2$(dobdc) | 8.21 | 193.0 | 24 |
| CD-MOF-2 | 7.73 | 58.0 | 25 |
| UTSA-16 | 7.62 (a) | 102.5 | 26 |
| $Cu(bpe)_2SiF_6$ | 6.26 | 62.1 | 23 |
| iso1 | 6.25 | 28.0 | 27 |
| $MgH_6$ODTMP | 5.40 (b) | 12.1 | 28 |
| Cu-TDPAT | 5.36 | 132.2 | 29 |
| UTSA-20 | 5.31 (c) | 112.0 | 30 |
| CAU-1 | 4.83 | 87.0 | 31 |
| NOTT-202 | 4.79 (d) | 31.6 | 32 |
| SNU-50 | 4.71 | 80.0 | 33 |
| ZIF-82 | 4.64 | 51.0 | 34 |
| PCN-26 | 4.53 | 109.1 | 35 |
| $Cu_2$(TCMBT)(bpp)($\mu^3$-OH) | 4.48 | 44.8 | 36 |
| UiO-66-$NH_2$ | 4.42 | 67.2 | 37 |
| UiO-66-2,5-$(OMe)_2$ | 4.34 | 58.2 | 37 |
| $Zn_4(OH)_2(1,2,4-btc)_2$ | 4.20 (e) | 42.0 | 38 |
| Cu(bdc-OH) | 4.00 (a) | 52.0 | 39 |
| MIL-120 | 4.00 (b) | 72.0 | 40 |
| NOTT-140 | 3.96 (d) | 93.0 | 41 |
| PCN-80 | 3.90 (e) | 61.1 | 42 |
| ZIF-78 | 3.85 | 50.0 | 43 |
| ZIF-81 | 3.80 | 38.0 | 43 |
| UiO-66-$NO_2$ | 3.76 | 57.1 | 37 |
| $Zn_5(bta)_6(tda)_2$ | 3.70 (e) | 37.0 | 44 |
| ZIF-68 | 3.60 | 36.0 | 43 |
| ZIF-95 | 3.58 | 18.6 | 45 |
| UiO-66 | 3.56 | 39.2 | 37 |
| $Cu_3$(TerTri)$_2$(dabco) | 3.56 | 32.0 | 46 |
| ZIF-69 | 3.55 | 39.0 | 43 |
| UiO-66-1,4-Naphthyl | 3.51 | 34.7 | 37 |
| SNU-21S | 3.46 | 56.5 | 47 |
| ZIF-79 | 3.30 | 33.0 | 43 |
| SNU-21H | 3.29 | 49.1 | 47 |
| SNU-25 | 3.27 | 33.4 | 48 |
| ZIF-100 | 3.19 | 20.0 | 45 |
| $Zn_3L2(4,4'-bipy)_2$ (FIR-2) | 3.18 | 35.0 | 49 |
| MIL-101(Cr) | 3.14 (f) | 24.6 | 50 |
| ZIF-70 | 3.11 | 28.0 | 43 |
| $Zn_2(ndc)_2$(DPNI) | 2.70 | 29.7 | 51 |
| MOF-508b | 2.57 (b) | 40.3 | 52 |
| SNU-77H | 2.32 | 20.1 | 53 |
| $Eu_2$(TPO)$_2$(HCOO) | 1.52 | 31.8 | 54 |
| $Y_2$(TPO)$_2$(HCOO) | 1.41 | 43.4 | 54 |

(a) 296 K;
(b) 303 K;
(c) 300 K;
(d) 293 K;
(e) 295 K;
(f) 313 K.

Ideal Adsorbed Solution Theory

In order to predict binary mixture adsorption in SIFSIX-1-Cu, TIFSIX-1-Cu, and SNIFSIX-1-Cu, the respective single-component $CO_2$, $CH_4$, and $N_2$ adsorption isotherms were first fit to the dual-site Langmuir-Freundlich equation[55]:

$$n = \frac{n_{m1}b_1 p^{\left(\frac{1}{t_1}\right)}}{1+b_1 p^{\left(\frac{1}{t_1}\right)}} + \frac{n_{m2}b_2 p^{\left(\frac{1}{t_2}\right)}}{1+b_2 p^{\left(\frac{1}{t_2}\right)}}$$

In this equation, n is the amount adsorbed per mass of adsorbent (in mol/kg), P is the total pressure (in kPa) of the bulk gas at equilibrium with the adsorbed phase, $n_{m1}$, and $n_{m2}$ are the saturation uptakes (in mol/kg) for sites 1 and 2, $b_1$ and $b_2$ are the affinity coefficients (in $kPa^{-1}$) for sites 1 and 2, and $t_1$ and $t_2$ are the heterogeneity factors for sites 1 and 2. All isotherms were fitted with $R^2 \geq 0.9999$. Indeed, this equation has been used to fit isotherm data for a variety of MOMs.[56-61] The fitted isotherm parameters were applied to perform the necessary integrations according to ideal adsorbed solution theory (IAST).[62,63] Afterwards, the selectivity for component i relative to component j was calculated by the following equation:

$$S_{i/j} = \frac{x_i y_j}{x_j y_i}$$

Here, $x_i$ and $y_i$ are the mole fractions of component i in the adsorbed and bulk phases, respectively.

TABLE 5

50/50 $CO_2/CH_4$ IAST Selectivities at 298 K and 1 atm of selected MOMs.

| MOM | Selectivity | Reference |
|---|---|---|
| ZIF-78 | 10 | 64, 65 |
| ZIF-8 | 1.32 | 66 |
| ZIF-82 | 9.8[a] | 64 |
| ZIF-95 | 4.3[a] | 67 |
| MOF-5 | 2.3 | 68 |
| UMCM-1 | 1.82 | 66 |
| MIL-53(Al) | 2.30 | 66 |
| MOF-177 | 0.89 | 66 |
| Zn(bdc)(dabco)$_{0.5}$ | 3.4[b] | 69 |
| HKUST-1 | ~8 | 65, 70 |
| MIL-101(Cr) | ~12 | 65, 70 |

[a]Henry's Law selectivity;
[b]at 294 K.

Modeling Studies.

Figure 11:
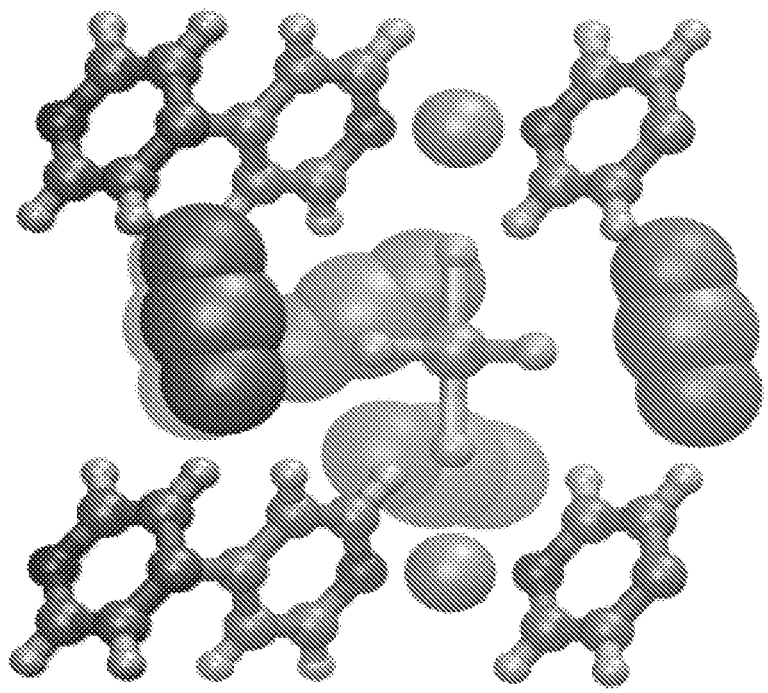
FIG. 11 illustrates a snapshot of the most favored $CO_2$ binding site in SIFSIX-1-Cu, TIFSIX-1-Cu, and SNIFSIX-1-Cu determined from modeling studies. Atom colors: C=gray, H=white, O=red, N=blue, F=cyan, Cu=tan, Si/Ti/Sn=violet.
Figure 12:
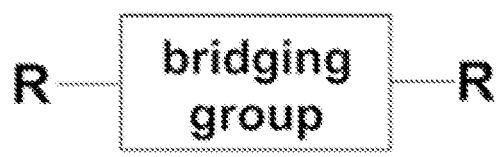
FIGS. 12-16 illustrate embodiments of linker ligands for the MOMs of the present disclosure.
Figure 13:
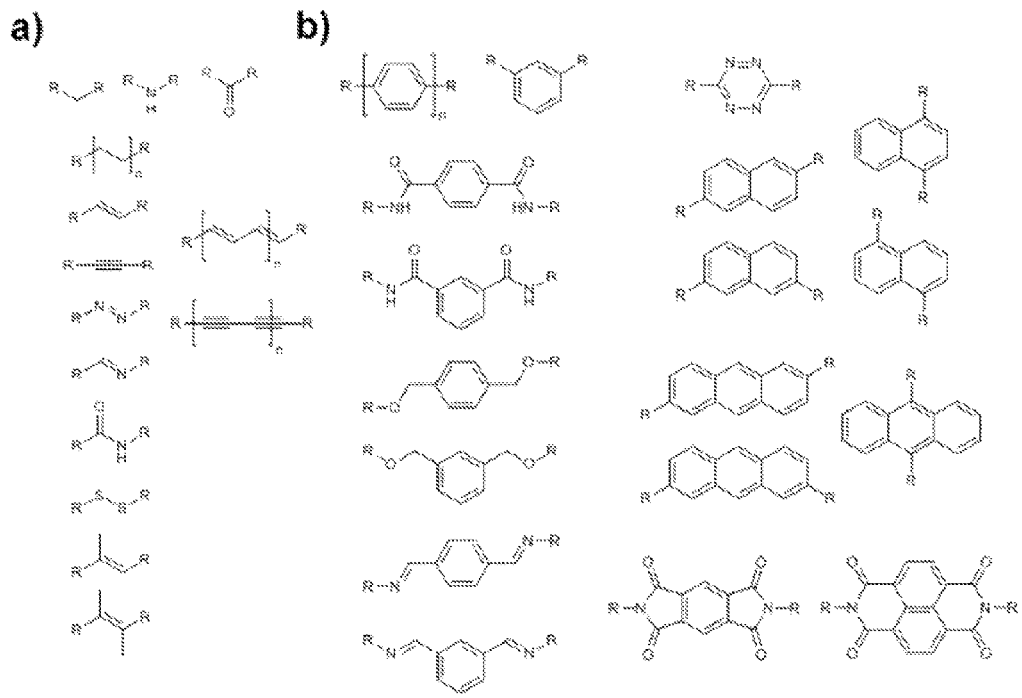

Modeling studies were performed to investigate the gas adsorption and separation mechanisms in SIFSIX-1-Cu, TIFSIX-1-Cu, and SNIFSIX-1-Cu. Highly accurate and transferable $CO_2$, $CH_4$, and $N_2$ potentials were developed using a previously described fitting procedure.[71,72] Simulation parameters including atomic point partial charges, repulsion/dispersion parameters, and atomic point polarizabilities were also developed according to previous considerations.[73-76] Grand canonical Monte Carlo (GCMC) simulations[77] were able to predict the most favorable $CO_2$ adsorption site in these structures based upon both binding energy and the magnitude of the dipole induced in $CO_2$. In all three MOMs this interaction occurs between the carbon atom of $CO_2$ and the equatorial fluorine atoms of the $MF_6^{2-}$ (M=Si, Ti, Sn) moieties (FIG. 11). Full details concerning modeling of the gas adsorption and separation mechanisms in these compounds will be described in a future manuscript.

REFERENCE FOR THE SUPPLEMENTAL INFORMATION

1. Bruker (2010). (APEX2). Bruker AXS Inc., Madison, Wis., USA.
2. Bruker (2009). SAINT.Data Reduction Software.Bruker AXS Inc., Madison, Wis., USA.
3. Sheldrick, G. M. (2008). SADABS.Program for Empirical Absorption Correction. University of Gottingen, Germany.
4. Farrugia L. *J. Appl. Cryst.* 1999,32, 837.
5. Sheldrick, G. M. (1997) SHELXL-97. Program for the Refinement of Crystal.
6. Sheldrick, G. M. *ActaCryst.* 1990, A46, 467.
7. Sheldrick, G. M. *ActaCryst.* 2008, A64, 112.
8. O. V. Dolomanov, L. J. Bourhis, R. J. Gildea, J. A. K. Howard and H. Puschmann, *J. Appl. Crystallogr.,* 2009, 42, 339.
9. T. L. Spek, *ActaCryst.* 1990. A46, 194.
10. T. L. Spek, *ActaCryst.* 1990. A46, c34.
11. Z. Bao, L. Yu, Q. Ren, X. Lu and S. Deng, *J. Colloid Interface Sci.,* 2011, 353, 549.
12. A. O. z. r. Yazaydin, R. Q. Snurr, T.-H. Park, K. Koh, J. Liu, M. D. LeVan, A. I. Benin, P. Jakubczak, M. Lanuza, D. B. Galloway, J. J. Low and R. R. Willis, *J. Am. Chem. Soc.,* 2009, 131, 18198.
13. M. Märcz, R. E. Johnsen, P. D. C. Dietzel and H. Fjellvåg, *Microporous Mesoporous Mater.,* 2012, 157, 62.
14. B. Li, Z. Zhang, Y. Li, K. Yao, Y. Zhu, Z. Deng, F. Yang, X. Zhou, G. Li, H. Wu, N. Nijem, Y. J. Chabal, Z. Lai, Y. Han, Z. Shi, S. Feng and J. Li, Angew. *Chem. Int. Ed.,* 2012, 51, 1412.
15. P. Aprea, D. Caputo, N. Gargiulo, F. Iucolano and F. Pepe, *J. Chem. Eng. Data,* 2010, 55, 3655.
16. B. Zheng, J. Bai, J. Duan, L. Wojtas and M. J. Zaworotko, *J. Am. Chem. Soc.,* 2011, 133, 748.
17. S. D. Burd, S. Ma, J. A. Perman, B. J. Sikora, R. Q. Snurr, P. K. Thallapally, J. Tian, L. Wojtas and M. J. Zaworotko, *J. Am. Chem. Soc.,* 2012, 134, 3663.
18. Z. Guo, H. Wu, G. Srinivas, Y. Zhou, S. Xiang, Z. Chen, Y. Yang, W. Zhou, M. O'Keeffe and B. Chen, Angew. *Chem. Int. Ed.,* 2011, 50, 3178.
19. A. R. Millward and O. M. Yaghi, *J. Am. Chem. Soc.,* 2005, 127, 17998.
20. W. Zhuang, D. Yuan, D. Liu, C. Zhong, J.-R. Li and H.-C. Zhou, *Chem. Mater.,* 2011, 24, 18.
21. T. M. McDonald, W. R. Lee, J. A. Mason, B. M. Wiers, C. S. Hong and J. R. Long, *J. Am. Chem. Soc.,* 2012, 134, 7056.
22. J. W. Yoon, S. H. Jhung, Y. K. Hwang, S. M. Humphrey, P. T. Wood and J. S. Chang, *Adv. Mater.,* 2007, 19, 1830.
23. S. D. Burd, S. Ma, J. A. Perman, B. J. Sikora, R. Q. Snurr, P. K. Thallapally, J. Tian, L. Wojtas and M. J. Zaworotko, *J. Am. Chem. Soc.,* 2012, 134, 3663.
24. Z. Bao, L. Yu, Q. Ren, X. Lu and S. Deng, *J. Colloid Interface Sci.,* 2011, 353, 549.
25. R. S. Forgan, R. A. Smaldone, J. J. Gassensmith, H. Furukawa, D. B. Cordes, Q. Li, C. E. Wilmer, Y. Y. Botros, R. Q. Snurr, A. M. Z. Slawin and J. F. Stoddart, *J. Am. Chem. Soc.,* 2011, 134, 406.
26. S. Xiang, Y. He, Z. Zhang, H. Wu, W. Zhou, R. Krishna and B. Chen, *Nat. Commun.,* 2012, 3, 954.

27. J. Ferrando-Soria, P. Serra-Crespo, M. de Lange, J. Gascon, F. Kapteijn, M. Julve, J. Cano, F. Lloret, J. Pasán, C. Ruiz-Pérez, Y. Journaux and E. Pardo, *J. Am. Chem. Soc.*, 2012, 134, 15301.
28. R. M. P. Colodrero, P. Olivera-Pastor, E. R. Losilla, D. Hernández-Alonso, M. A. G. Aranda, L. Leon-Reina, J. Rius, K. D. Demadis, B. Moreau, D. Villemin, M. Palomino, F. Rey and A. Cabeza, *Inorg. Chem.*, 2012, 51, 7689.
29. B. Li, Z. Zhang, Y. Li, K. Yao, Y. Zhu, Z. Deng, F. Yang, X. Zhou, G. Li, H. Wu, N. Nijem, Y. J. Chabal, Z. Lai, Y. Han, Z. Shi, S. Feng and J. Li, *Angew. Chem. Int. Ed.*, 2012, 51, 1412.
30. Z. Guo, H. Wu, G. Srinivas, Y. Zhou, S. Xiang, Z. Chen, Y. Yang, W. Zhou, M. O'Keeffe and B. Chen, *Angew. Chem. Int. Ed.*, 2011, 50, 3178.
31. X. Si, C. Jiao, F. Li, J. Zhang, S. Wang, S. Liu, Z. Li, L. Sun, F. Xu, Z. Gabelica and C. Schick, Energy & Environmental *Science*, 2011, 4, 4522.
32. S. Yang, X. Lin, W. Lewis, M. Suyetin, E. Bichoutskaia, J. E. Parker, C. C. Tang, D. R. Allan, P. J. Rizkallah, P. Hubberstey, N. R. Champness, K. Mark Thomas, A. J. Blake and M. Schröder, *Nat. Mater.*, 2012, 11, 710.
33. T. K. Prasad, D. H. Hong and M. P. Suh, *Chem.—Eur. J.*, 2010, 16, 14043.
34. R. Banerjee, H. Furukawa, D. Britt, C. Knobler, M. O'Keeffe and O. M. Yaghi, *J. Am. Chem. Soc.*, 2009, 131, 3875.
35. W. Zhuang, D. Yuan, D. Liu, C. Zhong, J. R. Li and H. C. Zhou, *Chem. Mater.*, 2011, 24, 18.
36. Z. Lu, H. Xing, R. Sun, J. Bai, B. Zheng and Y. Li, *Cryst. Growth Des.*, 2012, 12, 1081.
37. G. Cmarik, M. Kim, S. M. Cohen and K. S. Walton, *Langmuir*, 2012, doi: 10.1021/la3035352.
38. Z. Zhang, S. Xiang, X. Rao, Q. Zheng, F. R. Fronczek, G. Qian and B. Chen, *Chem. Commun.*, 2010, 46, 7205.
39. Z. Chen, S. Xiang, H. D. Arman, P. Li, S. Tidrow, D. Zhao and B. Chen, *Eur. J. Inorg. Chem.*, 2010, 2010, 3745.
40. C. Volkringer, T. Loiseau, M. Haouas, F. Taulelle, D. Popov, M. Burghammer, C. Riekel, C. Zlotea, F. Cuevas, M. Latroche, D. Phanon, C. Knöfelv, P. L. Llewellyn and G. r. Férey, *Chem. Mater.*, 2009, 21, 5783.
41. C. Tan, S. Yang, N. R. Champness, X. Lin, A. J. Blake, W. Lewis and M. Schroder, *Chem. Commun.*, 2011, 47, 4487.
42. W. Lu, D. Yuan, T. A. Makal, J.-R. Li and H. C. Zhou, *Angew. Chem. Int. Ed.*, 2012, 51, 1580.
43. R. Banerjee, H. Furukawa, D. Britt, C. Knobler, M. O'Keeffe and O. M. Yaghi, *J. Am. Chem. Soc.*, 2009, 131, 3875.
44. Z. Zhang, S. Xiang, Y. S. Chen, S. Ma, Y. Lee, T. Phely-Bobin and B. Chen, *Inorg. Chem.*, 2010, 49, 8444.
45. B. Wang, A. P. Cote, H. Furukawa, M. O'Keeffe and O. M. Yaghi, *Nature*, 2008, 453, 207.
46. C. Hou, Q. Liu, J. Fan, Y. Zhao, P. Wang and W.-Y. Sun, *Inorg. Chem.*, 2012, 51, 8402.
47. T. K. Kim and M. P. Suh, *Chem. Commun.*, 2011, 47, 4258.
48. Y. E. Cheon, J. Park and M. P. Suh, *Chem. Commun.*, 2009, 5436.
49. Y. X. Tan, Y. P. He and J. Zhang, *Cryst. Growth Des.*, 2012, 12, 2468.
50. P. Chowdhury, C. Bikkina and S. Gumma, *J. Phys. Chem. C*, 2009, 113, 6616.
51. Y.-S. Bae, K. L. Mulfort, H. Frost, P. Ryan, S. Punnathanam, L. J. Broadbelt, J. T. Hupp and R. Q. Snurr, *Langmuir*, 2008, 24, 8592.
52. L. Bastin, P. S. Barcia, E. J. Hurtado, J. A. C. Silva, A. E. Rodrigues and B. Chen, *J. Phys. Chem. C*, 2008, 112, 1575.
53. H. J. Park, D. W. Lim, W. S. Yang, T. R. Oh and M. P. Suh, *Chem.—Eur. J.*, 2011, 17, 7251.
54. Z. J. Lin, Z. Yang, T. F. Liu, Y. B. Huang and R. Cao, *Inorg. Chem.*, 2012, 51, 1813.
55. Yang, R. T. *Gas Separation by Adsorption Processes*; Imperial College Press, 1986.
56. Goetz, V.; Pupier, O.; Guillot, A. *Adsorption* 2006, 12, 55-63.
57. Babarao, R.; Hu, Z.; Jiang, J.; Chempath, S.; Sandler, S. I. *Langmuir* 2007, 23, 659-666.
58. Bae, Y. S., Mulfort, K. L., Frost, H.; Ryan, P.; Punnathanam, S.; Broadbelt, L. J.; Hupp, J. T.; Snurr, R. Q. *Langmuir* 2008, 24, 8592-8598.
59. Zheng, B.; Bai, J.; Duan, J.; Wojtas, L.; Zaworotko, M. J. *J. Am. Chem. Soc.* 2011, 133, 748-751.
60. Burd, S. D.; Ma, S.; Perman, J. A.; Sikora, B. J.; Snurr, R, Q.; Thallapally, P. K.; Tian, J.; Wojtas, L.; Zaworotko, M. J.; *J. Am. Chem. Soc.* 2012, 134, 3663-3666.
61. Zhang, Z.; Li, Z.; Li, J. *Langmuir* 2012, 28, 12122-12133.
62. Myers, A. L.; Prausnitz, J. M. *AIChE Journal* 1965, 11, 121-127.
63. Kidnay, A. J.; Myers, A. L. *AIChE Journal* 1966, 12, 981-986.
64. R. Banerjee, H. Furukawa, D. Britt, C. Knobler, M. O'Keeffe and O. M. Yaghi, *J. Am. Chem. Soc.*, 2009, 131, 3875.
65. S. Xiang, Y. He, Z. Zhang, H. Wu, W. Zhou, R. Krishna and B. Chen, *Nat. Commun.*, 2012, 3, 954.
66. Z. Xiang, X. Peng, X. Cheng, X. Li and D. Cao, *J. Phys. Chem. C*, 2011, 115, 19864.
67. B. Wang, A. P. Cote, H. Furukawa, M. O'Keeffe and O. M. Yaghi, *Nature*, 2008, 453, 207.
68. J. M. Simmons, H. Wu, W. Zhou and T. Yildirim, *Energy & Environmental Science*, 2011, 4, 2177.
69. P. Mishra, S. Mekala, F. Dreisbach, B. Mandal and S. Gumma, *Sep. Purif. Technol.*, 2012, 94, 124.
70. P. Chowdhury, S. Mekala, F. Dreisbach and S. Gumma, *Microporous Mesoporous Mater.*, 2012, 152, 246.
71. J. L Belof, A. C. Stern, B. Space, *J. Chem. Theory Comput.*, 2008, 4, 1332.
72. K. McLaughlin, C. R. Cioce, J. L. Belof, B. Space, *J. Chem. Phys.*, 2012, 136, 194302.
73. J. L. Belof, A. C. Stern, M. Eddaoudi, B. Space, *J. Am. Chem. Soc.*, 2007, 129, 15202.
74. J. L. Belof, A. C. Stern, B. Space, *J. Phys. Chem. C*, 2009, 113, 9316.
75. A. C. Stern, J. L. Belof, M. Eddaoudi, B. Space, *J. Chem. Phys.*, 2012, 136, 034705.
76. K. A. Forrest, T. Pham, K. McLaughlin, J. L. Belof, A. C. Stern, M. J. Zaworotko, B. Space, *J. Phys. Chem. C*, 2012, 116, 15538.
77. N. Metropolis, A. W. Rosenbluth, M. N. Rosenbluth, A. H. Teller, E. Teller, *Phys. Lett. B*, 1953, 21, 1087.

In regard to the discussion herein including the Examples above and the claims, it should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to measurement techniques and the units of the numerical value. In addition, the phrase "about 'x' to 'y'" includes "about 'x' to about 'y'".

Many variations and modifications may be made to the above-described embodiments. All such modifications and variations are intended to be included herein within the scope of this disclosure and protected by the following claims.

We claim:

1. A method of capturing a polarizable gas in a gas mixture, comprising:
    exposing the gas mixture to a multicomponent metal-organic material (MOM) of general formula $[ML_2TIFSIX]_n$, n is 1 to $10^{18}$, wherein the gas mixture includes the polarizable gas, wherein the MOM has a greater relative affinity for the polarizable gas than the other components in the gas mixture; wherein M is a divalent or trivalent metal, wherein L is a bifunctional linker molecule based upon two nitrogen donor moieties; and TIFSIX is hexafluorotitanate or hexafluorostannate; and
    capturing the polarizable gas in the MOM.

2. The method of claim 1, wherein the gas mixture includes at least one of the following gases: water vapor, $CO_2$, $N_2$, $H_2$, and $CH_4$, wherein the MOM has a greater relative affinity for $CO_2$ over each one of water vapor, $N_2$, $H_2$, and $CH_4$.

3. The method of claim 1, wherein the MOM is selected from the group consisting of: $[Cu(4,4'\text{-bipyridine})_2(TiF_6)]_n$, where n is 1 to $10^{18}$ and $[Cu(4,4'\text{-bipyridine})_2(SnF_6)]_n$, wherein n is 1 to $10^{18}$.

4. The method of claim 1, wherein the MOM has a primitive cubic topology.

5. A system for capturing a polarizable gas in a gas mixture, comprising: a first structure including a multidimensional metal-organic material (MOM) having a primitive cubic topology, of general formula $[ML_2 TIFSIX]_n$, n is 1 to $10^{18}$, wherein the gas mixture includes the polarizable gas, wherein the MOM has a greater relative affinity for polarizable gas than the other components in the gas mixture; wherein M is a divalent or trivalent metal, wherein L is a bifunctional linker molecule based upon two nitrogen donor moieties; and TIFSIX is hexafluorotitanate or hexafluorostannate; and a second structure for introducing the gas to the first structure, wherein polarizable gas is substantially removed from the gas mixture after the exposure to the MOM to form a modified gas mixture, wherein the second structure flows the modified gas mixture away from the first structure.

6. The system of claim 5, wherein the gas mixture includes at least one of the following gases: $CO_2$, $N_2$, $H_2$, and $CH_4$, wherein the MOM has a greater relative affinity for $CO_2$ over each one of $N_2$, $H_2$, and $CH_4$.

7. A method of separating components in a gas mixture, comprising: exposing a gas mixture including a first component and a second component to a multidimensional metal-organic material (MOM), of general formula $[ML_2 TIFSIX]_n$, n is 1 to $10^{18}$, wherein the first component is a polarizable gas, wherein the MOM has a greater relative affinity for the polarizable gas than the other components in the gas mixture; wherein M is a divalent or trivalent metal, wherein L is a bifunctional linker molecule based upon two nitrogen donor moieties; and TIFSIX is hexafluorotitanate or hexafluorostannate, wherein the MOM has a greater relative affinity for the first component over the second component; and capturing the first component in the MOM.

8. The method of claim 7, wherein the first component is $CO_2$ and the second gas is $N_2$.

9. The method of claim 7, wherein the first component is $CO_2$ and the second gas is $H_2$.

10. The method of claim 7, wherein the first component is $CO_2$ and the second gas is $CH_4$.

11. The method of claim 7, wherein the first component is He and the second gas is natural gas.

* * * * *